(12) United States Patent
Han et al.

(10) Patent No.: US 10,091,020 B2
(45) Date of Patent: Oct. 2, 2018

(54) ELECTRONIC DEVICE AND GATEWAY FOR NETWORK SERVICE, AND OPERATION METHOD THEREFOR

(71) Applicant: Samsung Electronics Co., Ltd., Suwon-si, Gyeonggi-do (KR)

(72) Inventors: Sang-Bum Han, Suwon-si (KR); Eun-Young Cho, Seoul (KR); Woo-Kwang Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 314 days.

(21) Appl. No.: 14/881,912

(22) Filed: Oct. 13, 2015

(65) Prior Publication Data

US 2016/0105331 A1    Apr. 14, 2016

(30) Foreign Application Priority Data

Oct. 13, 2014    (KR) .................. 10-2014-0137678

(51) Int. Cl.
| | |
|---|---|
| *G06F 3/0484* | (2013.01) |
| *H04L 12/28* | (2006.01) |
| *G06F 3/0481* | (2013.01) |
| *G06F 3/0482* | (2013.01) |
| *H04L 12/26* | (2006.01) |

(52) U.S. Cl.
CPC ........ *H04L 12/2823* (2013.01); *G06F 3/0482* (2013.01); *G06F 3/04817* (2013.01); *G06F 3/04842* (2013.01); *H04L 12/282* (2013.01); *H04L 12/2832* (2013.01); *H04L 43/0817* (2013.01)

(58) Field of Classification Search
CPC ..... G06F 3/0484; G06F 3/0481; G06F 3/0482
See application file for complete search history.

(56) References Cited

U.S. PATENT DOCUMENTS

| | | | |
|---|---|---|---|
| 2007/0001904 A1* | 1/2007 | Mendelson | G01C 21/206 342/450 |
| 2008/0051118 A1 | 2/2008 | Shin | |
| 2010/0269040 A1* | 10/2010 | Lee | G06F 3/04817 715/702 |
| 2014/0172378 A1 | 6/2014 | Shim et al. | |
| 2014/0218517 A1 | 8/2014 | Kim et al. | |
| 2015/0019074 A1* | 1/2015 | Winter | G10L 15/01 701/36 |
| 2015/0046828 A1* | 2/2015 | Desai | G06F 1/163 715/739 |

(Continued)

FOREIGN PATENT DOCUMENTS

| | | |
|---|---|---|
| KR | 10-2005-0121089 A | 12/2005 |
| KR | 10-2014-0077361 A | 6/2014 |
| KR | 10-2014-0077817 A | 6/2014 |

*Primary Examiner* — David Choi
(74) *Attorney, Agent, or Firm* — Jefferson IP Law, LLP

(57) ABSTRACT

A method of operating an electronic device is provided. The method includes displaying a space drawing visualizing an indoor space and at least one icon related to an execution instruction to be transmitted to a network device, recognizing that an icon selected among the displayed at least one icon is overlapped on an image of the network device included in the space drawing, and transmitting the execution instruction corresponding to the selected icon, to the network device.

14 Claims, 27 Drawing Sheets

(56) References Cited

U.S. PATENT DOCUMENTS

| | | | |
|---|---|---|---|
| 2015/0095790 A1* | 4/2015 | Yoshida | G06F 3/0482 715/740 |
| 2016/0105331 A1* | 4/2016 | Han | G06F 3/04842 715/736 |
| 2016/0179340 A1* | 6/2016 | Ogawa | G08C 17/02 715/736 |
| 2016/0301543 A1* | 10/2016 | Minezawa | G08C 17/02 |

* cited by examiner

ELECTRONIC DEVICE AND GATEWAY FOR NETWORK SERVICE, AND OPERATION METHOD THEREFOR

CROSS-REFERENCE TO RELATED APPLICATION(S)

This application claims the benefit under 35 U.S.C. § 119(a) of a Korean patent application filed on Oct. 13, 2014 in the Korean Intellectual Property Office and assigned Ser. No. 10-2014-0137678, the entire disclosure of which is hereby incorporated by reference.

TECHNICAL FIELD

The present disclosure relates to an electronic device and a gateway. More particularly, the present disclosure relates to a method for providing a network service and an electronic device and gateway thereof.

BACKGROUND

Generally, electronic devices such as portable terminals, provide a service of clicking an icon of a smart home application to control a smart device, i.e., a network device. This service is able to provide an interface for a separate individual application of each smart device through each application.

However, these electronic devices merely control the smart device by means of the icon, etc. of the smart home application, and have a disadvantage of having to have a separate application in every smart device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a user-friendly and integrated interface to a smart device (or network device), by instructing an execution instruction for the smart device using a drawing imaging a specific space (e.g., an indoor space) in an electronic device.

In accordance with an aspect of the present disclosure, an operating method of an electronic device is provided. The method includes displaying a space drawing visualizing an indoor space and at least one icon related to an execution instruction to be transmitted to a network device, recognizing that an icon selected among the displayed at least one icon is overlapped on an image of the network device included in the space drawing, and transmitting the execution instruction corresponding to the selected icon to the network device.

In accordance with another aspect of the present disclosure, an operating method of a gateway is provided. The method includes receiving space information displaying an image of a network device on a space drawing visualizing an indoor space, from an electronic device, storing the space information and, if receiving an execution instruction for controlling the network device from the electronic device, transmitting the execution instruction to the network device by using the stored space information.

In accordance with another aspect of the present disclosure, an electronic device is provided. The electronic device includes a display, a communication interface, and a processor controlling the display and the communication interface. The processor may be configured to display a space drawing visualizing an indoor space and at least one icon related to an execution instruction to be transmitted to a network device, and recognize that an icon selected among the displayed at least one icon is overlapped on an image of the network device included in the space drawing, and transmit the execution instruction corresponding to the selected icon, to the network device through the communication interface.

In accordance with another aspect of the present disclosure, a gateway is provided. The gateway includes a communication interface, a memory, and a processor controlling the communication interface and the memory. The processor may be configured to receive space information displaying an image of a network device on a space drawing visualizing an indoor space, from an electronic device through the communication interface, and store the space information and, if receiving an execution instruction for controlling the network device from the electronic device, transmit the execution instruction to the network device by using the stored space information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary.

Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
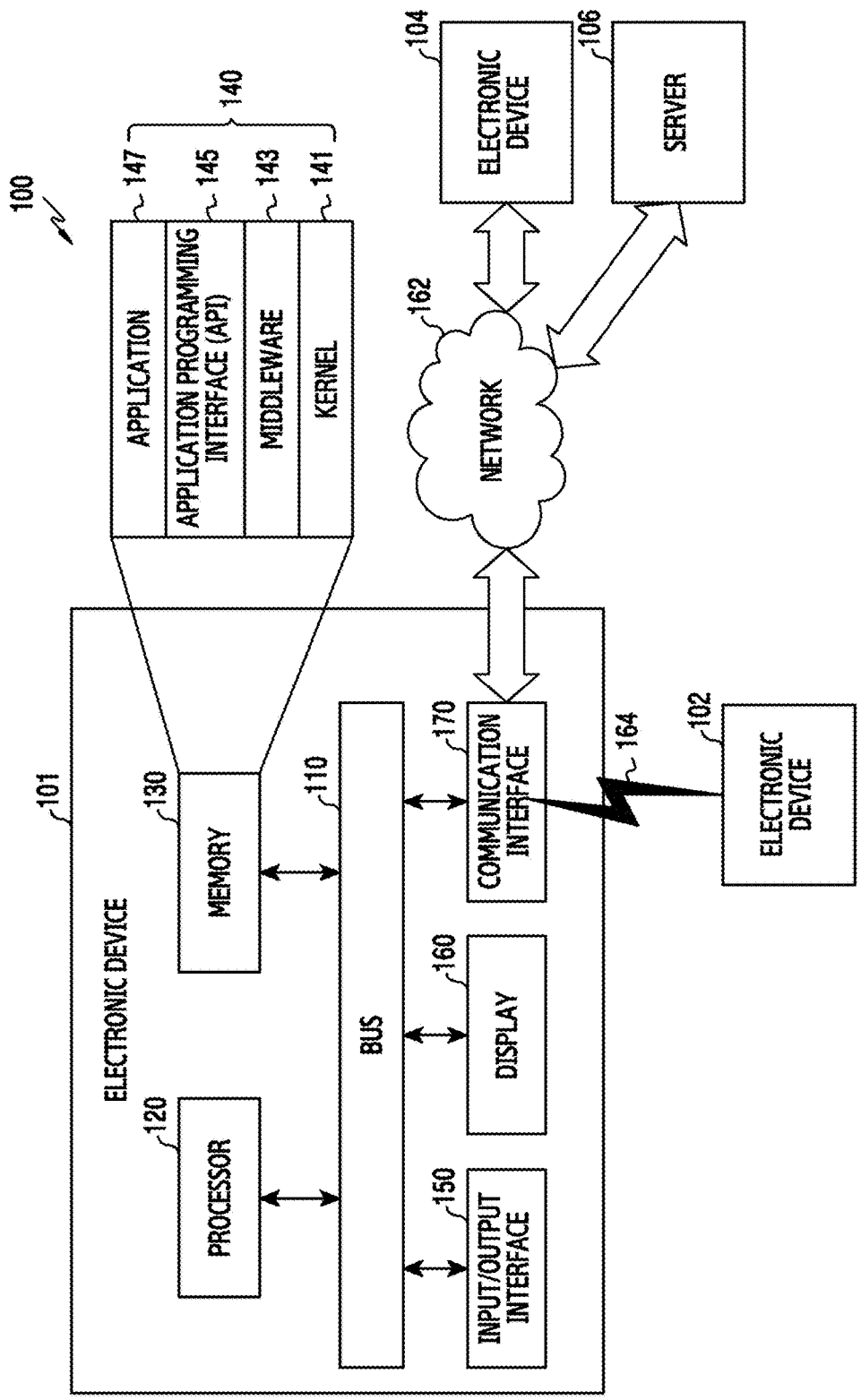
FIG. 1 illustrates an electronic device within a network environment according to various embodiments of the present disclosure.

FIG. 1 illustrates an electronic device within a network environment according to various embodiments of the present disclosure.

Referring to FIG. 1, according to various embodiments of the present disclosure, an electronic device 101 within a network environment 100 is illustrated. The electronic device 101 may include a bus 110, a processor 120, a memory 130, an I/O (input/output) interface 150, a display 160, and a communication interface 170. In some embodiments, the electronic device 101 may omit at least one of the components, or additionally include other components.

The bus 110 may include, for example, a circuit that interconnects components 110 to 170 and transmits communication (e.g., control message and/or data) among the components.

The processor 120 may include at least one of a CPU, an AP, and a communication processor (CP). The processor 120 may perform operations or data processing which is associated with control and/or communication of one or more other components of the electronic device 101.

The memory 130 may include a volatile and/or non-volatile memory. The memory 130 may store, for example, instructions or data associated with the one or more other components of the electronic device 101.

According to an embodiment, the memory 130 may store software and/or programs 140. The program 140 may include, for example, a kernel 141, a middleware 143, an application programming interface (API) 145, and/or an application program (or "application") 147. At least a part of the kernel 141, the middleware 143, or the API 145 may be referred to as an operating system (OS).

The kernel 141 may control or manage, for example, system resources (e.g., the bus 110, the processor 120, the memory 130, etc.) which are used to execute operations or functions implemented in other programs (e.g., the middleware 143, the API 145, or the application program 147). In addition, the kernel 141 may include an interface that can access individual components of the electronic device 101 in the middleware 143, the API 145, or the application program 147 to thereby control or manage the system resources.

The middleware 143 may act as an intermediary so that the API 145 or the application program 147 communicates with the kernel 141 to transmit and receive data.

In addition, the middleware 143 may process one or more operation requests which have been received from the application program 147, according to a priority. For example, the middleware 143 may assign a priority capable of using the system resources (e.g., the bus 110, the processor 120, the memory 130, etc.) of the electronic device 101 to at least one of the application programs 147. For example, the middleware 143 may perform scheduling or load balancing for the one or more operation requests, by processing the one or more operation requests according to the priority assigned to at least one of the application programs 147.

The API 145 is an interface for controlling a function provided from the kernel 141 or the middleware 143 by the application 147, and may include, for example, one or more interface or function (e.g. commands) for file control, window control, image processing, or character control, and the like.

The I/O interface 150 may act as, for example, an interface that can transmit instructions or data input from a user or other external devices to the other component(s) of the electronic device 101. In addition, the I/O interface 150 may output the instructions or data received from the other component(s) of the electronic device 101 to the user or the other external devices.

The display 160 may include, for example, a liquid crystal display (LCD), a light-emitting diode (LED) display, an organic light-emitting diode (OLED) display, a micro-electromechanical system (MEMS) display, an electronic paper display, or the like. The display 160 may display, for example, a variety of contents (e.g., texts, images, videos, icons, symbols, etc.) to a user. The display 160 may include a touch screen, and receive, for example, a touch, a gesture, a detection of a proximity, a detection of a hovering input using an electronic pen or a part of a user's body, etc.

The communication interface 170 may set communication between, for example, the electronic device 101 and an external device (e.g., a first external electronic device 102, a second external electronic device 104, or a server 106). For example, the communication interface 170 may be connected to a network 162 through wireless communication or wired communication to thereby communicate with the external device (e.g., the second external electronic device 104 or the server 106).

The wireless communication may be, for example, a cellular communication protocol, and use, for example, at least one of long-term evolution (LTE), LTE-Advanced (LTE-A), code division multiple access (CDMA), wideband CDMA (WCDMA), universal mobile telecommunications system (UMTS), wireless broadband (WiBro), and global system for mobile communications (GSM). In addition, the wireless communication may include, for example, short-range communication 164. The short-range communication 164 may include, for example, at least one of wireless fidelity (Wi-Fi), Bluetooth, near field communication (NFC), and global positioning system (GPS). The wired communication may include, for example, at least one of universal serial bus (USB), high definition multimedia interface (HDMI), recommended standard 232 (RS-232), and plain old telephone service (POTS). The network 162 may be a communications network, and include, for example, at least one of a computer network (e.g., local-area network (LAN) or wide area network (WAN)), the Internet, and a telephone network.

At least one of the first external electronic device 102 and the second external electronic device 104 and the electronic device 101 may be the same or a different kind of device. According to an embodiment, the server 106 may include a group of one or more servers. According to various embodiments, all or some of operations performed in the electronic device 101 may be performed in another electronic device, a plurality of electronic devices (e.g., the electronic devices 102 and 104), or the server 106. According to an embodiment, when it is required to execute some functions or services automatically or in response to requests, the electronic device 101 may additionally request at least some of the functions associated with the electronic device 101 from other devices (e.g., the electronic devices 102 and 104) or the server 106, instead of autonomously executing the function or the service. The other electronic devices (e.g., the electronic devices 102 and 104) or the server 106 may execute the requested function or the additional function, and transmit the execution result to the electronic device 101. The electronic device 101 may process the received result as is or additionally and thereby provide the requested function or service. For this, for example, cloud computing, distributed computing, or client-server computing technologies may be used.

Figure 2:
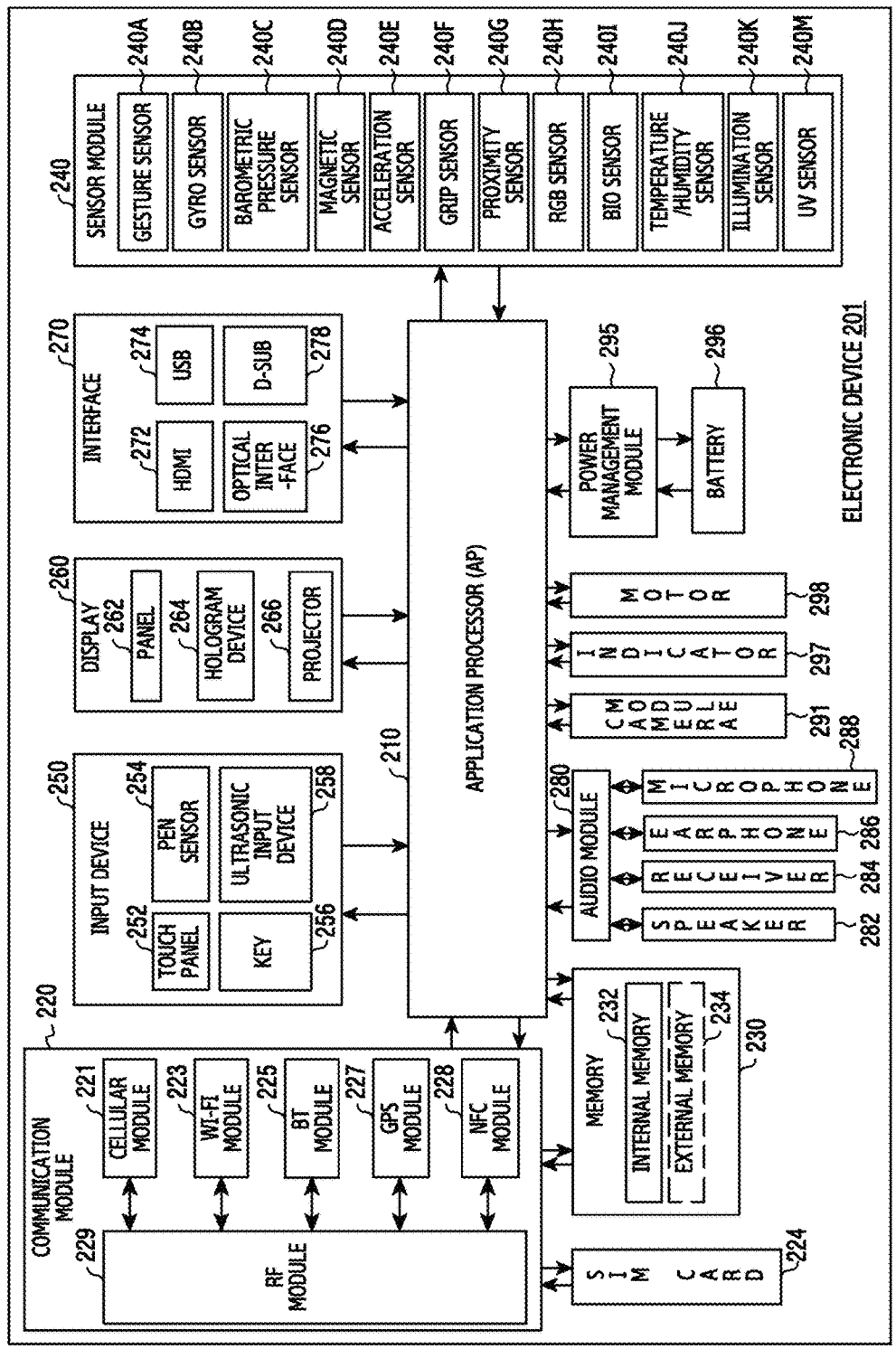
FIG. 2 is a block diagram of an electronic device according to various embodiments of the present disclosure.

FIG. 2 is a block diagram of an electronic device according to various embodiments of the present disclosure.

Referring to FIG. 2, the electronic device 201 may include all or some of the components of the electronic device 101 illustrated in FIG. 1. The electronic device 201 may include one or more processors (e.g., AP 210), a communication module 220, a subscriber identity module 224, a memory 230, a sensor module 240, an input device 250, a display 260, an interface 270, an audio module 280, a camera module 291, a power management module 295, a battery 296, an indicator 297, and a motor 298.

The processor 210 may drive, for example, an OS or an application program to control a plurality of hardware or software components connected to the processor 210 and to perform a variety of data processing and operations. The processor 210 may be implemented in a system on chip (SoC).

According to an embodiment of the present disclosure, the processor 210 may further include a graphic processing unit (GPU) and/or an image signal processor. The processor 210 may include at least some (e.g., a cellular module 221) of the components illustrated in FIG. 2. The processor 210 may load an instruction or data received from at least one of the other components (e.g., a non-volatile memory) to a volatile memory to process the loaded instruction or data, and store a variety of data in the non-volatile memory.

The communication module 220 may have the same as or similar to the communication interface 170 of FIG. 1. The communication module 220 may include, for example, the cellular module 221, a Wi-Fi module 223, a Bluetooth module 225, a GPS module 227, an NFC module 228, and a radio frequency (RF) module 229.

The cellular module 221 may provide voice calls, video calls, SMSs, Internet services, etc., through, for example, a communication network.

According to an embodiment, the cellular module 221 may perform identification and authentication of the electronic device 201 within a communication network, using a subscriber identity module (e.g., a SIM card) 224.

According to an embodiment, the cellular module 221 may perform at least some of functions that can be provided by the processor 210.

According to an embodiment, the cellular module 221 may include a CP.

At least one of the Wi-Fi module 223, the Bluetooth module 225, the GPS module 227, and the NFC module 228 may include, for example, a processor for processing data transmitted and received through the corresponding module.

According to some embodiments, at least some (e.g., two or more) of the cellular module 221, the Wi-Fi module 223, the Bluetooth module 225, the GPS module 227, and the NFC module 228 may be included within a single integrated chip (IC) or an IC package.

The RF module 229 may transmit and receive, for example, communication signals (e.g., RF signals). The RF module 229 may include, for example, a transceiver, a power amplifier module (PAM), a frequency filter, a low noise amplifier (LNA), an antenna, or the like.

According to another embodiment, at least one of the cellular module 221, the Wi-Fi module 223, the Bluetooth module 225, the GPS module 227, and the NFC module 228 may transmit and receive the RF signals through a separate RF module.

The subscriber identity module 224 may include, for example, a card and/or an embedded SIM each having subscriber identity information, and include unique identification information (e.g., integrated circuit card identifier (ICCID)) or subscriber information (e.g., international mobile subscriber identity (IMSI)).

The memory 230 (e.g., the memory 130) may include, for example, an internal memory 232 or an external memory 234. The internal memory 232 may include, for example, at least one of a volatile memory (e.g., a dynamic RAM (DRAM), an static RAM (SRAM), an synchronous dynamic RAM (SDRAM), or the like) and a non-volatile memory (e.g., an one time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, a NOR flash, or the like), a hard drive, or a solid state drive (SSD)).

The external memory 234 may further include a flash drive, for example, a compact flash (CF), a secure digital (SD), a micro secure digital (micro-SD), a mini secure digital (Mini-SD), an extreme digital (xD), a Multi Media Card (MMC), a memory stick, or the like. The external memory 234 may be functionally and/or physically connected to the electronic device 201 through various interfaces.

The sensor module 240 may measure, for example, a physical quantity or detect an operation state of the electronic device 201 and thereby convert the measured and detected information into electric signals. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., an red, green, and blue (RGB) sensor), a biometric sensor 240I, a temperature/humidity sensor 240J, a luminance sensor 240K, and a ultra violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein.

According to embodiments of the present disclosure, the electronic device 201 may further include a processor that is configured to control the sensor module 240 as a part of the processor 210 or separately from the processor 210, so that the sensor module 240 may be controlled even while the processor 210 is in a sleep state.

The input device 250 may include, for example, a touch panel 252, a (digital) pen sensor 254, a key 256, or an ultrasonic input device 258. The touch panel 252 may use at least one of an electrostatic scheme, a pressure-sensitive scheme, an infrared scheme, and an ultrasonic scheme. In addition, the touch panel 252 may further include a control circuit. The touch panel 252 may further include a tactile layer, and thereby provide a user with a tactile reaction.

The (digital) pen sensor 254 may be, for example, a part of the touch panel, or include a separate sheet for recognition. The key 256 may include, for example, physical buttons, an optical key, or a keypad. The ultrasonic input device 258 may detect ultrasonic waves generated from an input tool via a microphone (e.g., a microphone 288), and determine data corresponding to the detected ultrasonic waves.

The display 260 (e.g., the display 160) may include a panel 262, a hologram device 264, or a projector 266. The panel 262 may be implemented in a flexible, transparent, or wearable manner. The panel 262 may be constructed as one module with the touch panel 252. The hologram device 264 may use an interference of light and show a stereoscopic image in the air. The projector 266 may project light to a screen and display an image. The screen may be positioned, for example, inside or outside the electronic device 201.

According to an embodiment, the display 260 may further include a control circuit for controlling the panel 262, the hologram device 264, or the projector 266.

The interface 270 may include, for example, an HDMI 272, a USB 274, an optical interface 276, or a d-subminiature (D-sub) 278. The interface 270 may be included in, for example, the communication interface 170 illustrated in FIG. 1. Additionally or alternatively, the interface 270 may include, for example, a mobile high-definition link (MHL) interface, an SD card/multi-media card (MMC) interface, or an infrared data association (IrDA) standard interface.

The audio module 280 may bilaterally convert, for example, sounds and electric signals. At least some components of the audio module 280 may be included, for example, in the I/O interface 150 illustrated in FIG. 1. The audio module 280 may process sound information input or output via a speaker 282, a receiver 284, an earphone 286, the microphone 288, or the like.

The camera module 291 is a device for capturing, for example, still images and moving images, and according to an embodiment, may include one or more image sensors (e.g., a front sensor or a rear sensor), lens, an image signal processor (ISP), or a flash (e.g., an LED, a xenon lamp, or the like).

The power management module 295 may manage, for example, power of the electronic device 201.

According to an embodiment, the power management module 295 may include a power management integrated circuit (PMIC), a charger integrated circuit (IC), or a battery or fuel gauge. The PMIC may have wired and/or wireless charging schemes. The wireless charging scheme may include, for example, a magnetic resonance type, a magnetic induction type, an electromagnetic type, etc., and may further include an additional circuit for wireless charging, for example, a coil loop, a resonant circuit, a rectifier, or the like. The battery gauge may measure, for example, a residual quantity of the battery 296 and a voltage, a current, and a temperature, such as during charging. The battery 296 may include a rechargeable battery and/or a solar battery.

The indicator 297 may indicate a specific state, e.g., a booting state, a message state, a charging state, and the like of the electronic device 201 or a part thereof (e.g., the processor 210). The motor 298 may convert an electric signal into a mechanical vibration, and generate a vibration, a haptic effect (e.g., haptic feedback or force feedback), etc. Although not shown, the electronic device 201 may include a processing unit (e.g., GPU) for supporting a mobile TV. The processing unit for supporting the mobile TV may process media data according to a protocol of, for example, digital multimedia broadcasting (DMB), digital video broadcasting (DVB), or mediaFlo™.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
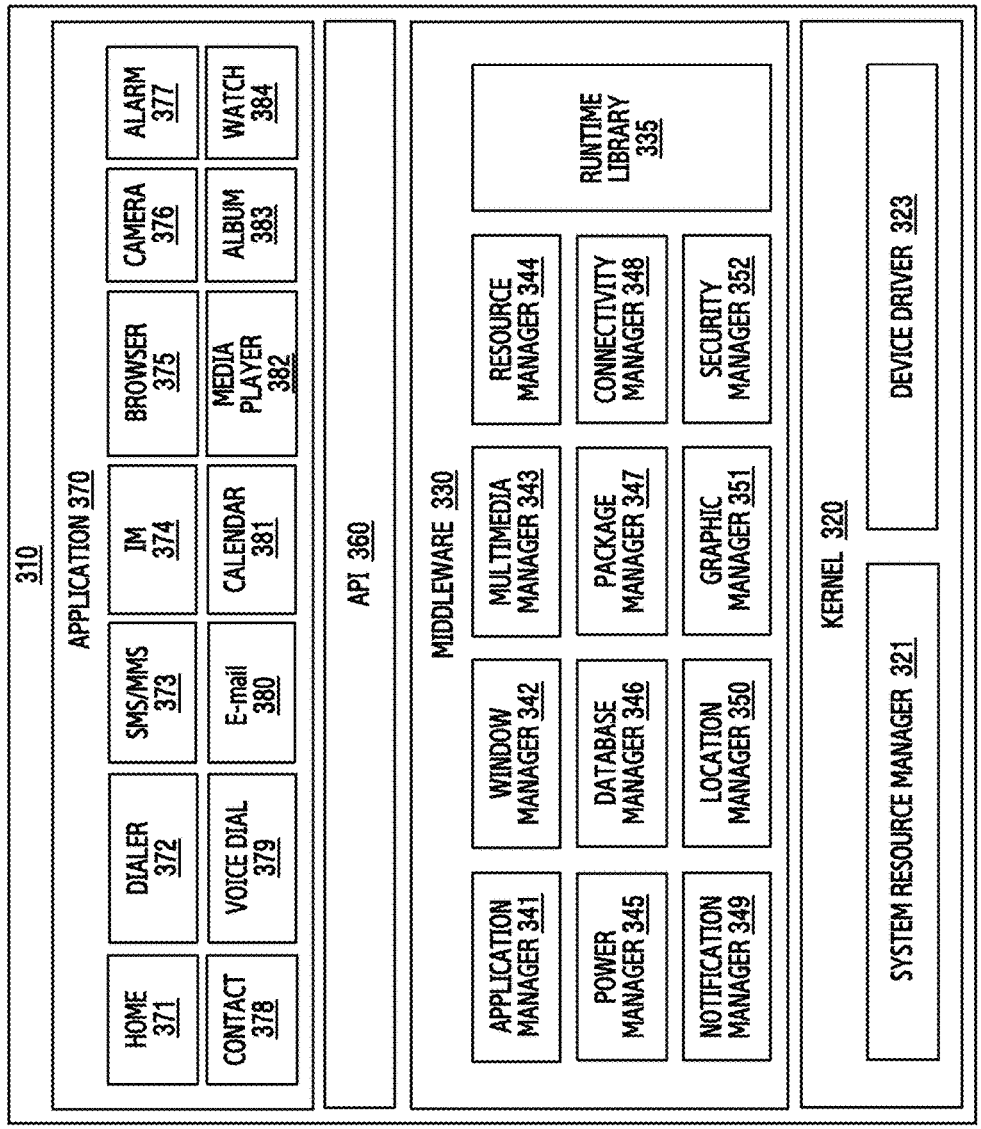
FIG. 3 is a block diagram of a program module according to various embodiments of the present disclosure.

FIG. 3 is a block diagram of a program module according to various embodiments of the present disclosure.

Referring to FIG. 3, the program module 310 (e.g., the program 140) may include an operating system (OS) controlling resources related to an electronic device (e.g., the electronic device 101), and/or various applications (e.g., the application program 147) being run on the OS. For example, the OS may be Android, iPhone OS (iOS), Windows, Symbian, Tizen, or Bada, etc.

The program module 310 may include a kernel 320, a middleware 330, an application programming interface (API) 360, and/or an application 370. At least a part of the program module 310 is preloaded on the electronic device or is downloaded from a server (e.g., the server 106).

The kernel 320 (e.g., the kernel 141 of FIG. 1) may, for example, include a system resource manager 321 or a device driver 323. The system resource manager 321 may perform control of a system resource, allocation thereof, or recovery thereof, etc. According to an embodiment of the present disclosure, the system resource manager 321 may include a process management unit, a memory management unit, or a file system management unit, etc. The device driver 323 may, for example, include a display driver, a camera driver, a Bluetooth driver, a shared memory driver, a universal serial bus (USB) driver, a keypad driver, a wireless fidelity (Wi-Fi) driver, an audio driver, or an inter-process communication (IPC) driver.

The middleware 330 may, for example, provide functions commonly required by the application 370, or may provide various functions to the application 370 through the API 360 such that the application 370 may make efficient use of restricted system resources within the electronic device. According to an embodiment of the present disclosure, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include, for example, a library module that is used by a compiler to add a new function through a programming language while the application 370 is run. The runtime library 335 may perform a function of input/output management, memory management, or arithmetic function, etc.

The application manager 341 may manage, for example, a life cycle of at least one application among the application 370. The window manager 342 may manage a GUI resource used in a screen. The multimedia manager 343 may detect a format necessary for playing various media files, and perform encoding or decoding of the media file using a codec adapted to the corresponding format. The resource manager 344 may manage a resource such as a source code of at least any one application among the application 370, a memory thereof, a storage space thereof, etc.

The power manager 345 may operate together with a basic input/output system (BIOS), etc. and manage a battery or power source, and provide electric power information, etc. necessary for an operation of the electronic device. The database manager 346 may create, search or change a database that is to be used in at least one application among the application 370. The package manager 347 may manage installation or updating of an application distributed in a form of a package file.

The connectivity manager 348 may manage, for example, wireless connectivity such as Wi-Fi, or Bluetooth, etc. The notification manager 349 may display or notify an event such as an arrival message, an appointment, a proximity notification, etc. in a way not disturbing a user. The location manager 350 may manage location information of the electronic device. The graphic manager 351 may manage a graphic effect to be provided to the user or a user interface related to this. The security manager 352 may provide a general security function necessary for system security, or user authentication, etc. According to an embodiment of the present disclosure, if the electronic device (e.g., the electronic device 101) has a phone function, the middleware 330 may further include a telephony manager (not shown) for managing a voice or video telephony function of the electronic device.

The middleware 330 may include a middleware module forming a combination of various functions of the aforementioned constituent elements. The middleware 330 may provide a module that is specialized by kind of the OS to provide a differentiated function. Also, the middleware 330 may dynamically delete some of the existing constituent elements or add new constituent elements.

The API 360 (e.g., the API 145), for example, a set of API programming functions, may be provided to have a different construction in accordance to the OS. For example, in a case of Android or iOS, it may provide one API set by platform and, in a case of Tizen, it may provide two or more API sets by platform.

The application 370 (e.g., the application program 147) may, for example, include one or more applications capable of providing functions of a home 371, a dialer 372, a short message service (SMS)/multimedia messaging service (MMS) 373, an instant message (IM) 374, a browser 375, a camera 376, an alarm 377, a contact 378, a voice dial 379, an electronic mail (e-mail) 380, a calendar 381, a media player 382, an album 383, or a clock 384, health care (e.g., measuring momentum or blood sugar) or environment information provision (e.g., providing air pressure, humidity, or temperature information, etc.), etc.

According to an embodiment of the present disclosure, the application 370 may include an application ("information exchange application" for description convenience below) supporting information exchange between the electronic device (e.g., the electronic device 101) and an external electronic device (e.g., the electronic device 102, 104). The information exchange application may, for example, include a notification relay application for relaying specific information to the external electronic device or a device management application for managing the external electronic device.

For example, the notification relay application may include a function of relaying to the external electronic device (e.g., the electronic device 102, 104) notification information generated in other applications (e.g., an SMS/MMS application, an e-mail application, a health care application, or an environment information application) of the electronic device. Also, the notification relay application may, for example, receive notification information from the external electronic device and provide the received notification information to a user. The device management application may, for example, manage (e.g., install, delete or update) at least one function (e.g., turn-on/turn-off of the external electronic device itself (or some constituent components) or adjustment of a brightness (or a resolution of a display) of the external electronic device (e.g., the electronic device 104) communicating with the electronic device, an application operating in the external electronic device, or a service (e.g., a telephony service or a message service) provided in the external electronic device.

According to an embodiment of the present disclosure, the application 370 may include an application designated according to an attribute of the external electronic device (e.g., the electronic device 102, 104) (for example, as an attribute of an electronic device, the kind of the electronic device is a mobile medical instrument). According to an embodiment of the present disclosure, the application 370 may include an application received from the external electronic device (e.g., the server 106 or the electronic device 102, 104). According to an embodiment of the present disclosure, the application 370 may include a preloaded application, or a third-party application downloadable from the server 106. The names of the constituent elements of the program module 310 according to the illustrated embodiment may be different in accordance to the kind of the OS.

According to various embodiments, at least a part of the program module 310 may be implemented in software, firmware, hardware, or a combination of at least two or more of them. For example, the at least part of the program module 310 may be implemented (e.g., executed) by a processor (e.g., the AP 210). At least a part of the program module 310 may include, for example, a module, a program, a routine, sets of instructions, or a process, etc. for performing one or more functions.

Figure 4:
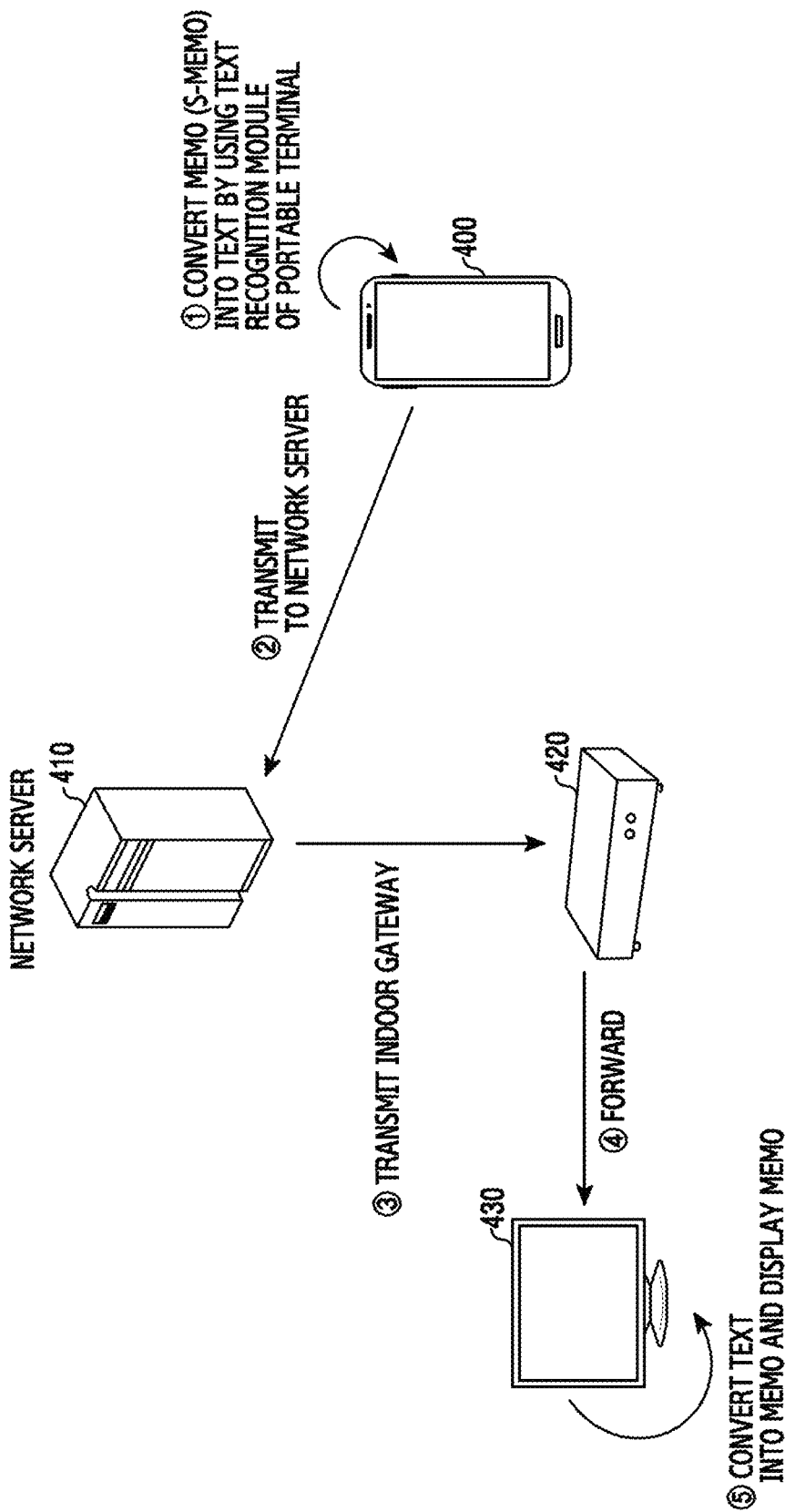
FIG. 4 illustrates constituent elements of a network environment according to various embodiments of the present disclosure.

FIG. 4 illustrates constituent elements of a network environment according to various embodiments of the present disclosure.

Referring to FIG. 4, the network environment may include an electronic device 400 corresponding to a portable terminal, a network server 410, a gateway 420, and a smart TV 430. According to various embodiments of the present disclosure, the electronic device 400 may write (i.e., input) a memo through a memo application. At this time, the electronic device 400 may use a text recognizing module to convert the written memo into a text (message), and transmit the converted text to the network server 410. The network server 410 may forward to the indoor gateway 420 the text received from the electronic device 400. Thereafter, the gateway 420 may search a target network device to which the received text is to be forwarded, and forward the text to the smart TV 430 corresponding to the searched network device. The smart TV 430 may convert the text received from the gateway 420 into a memo, and display the memo on a display screen.

Figure 5:
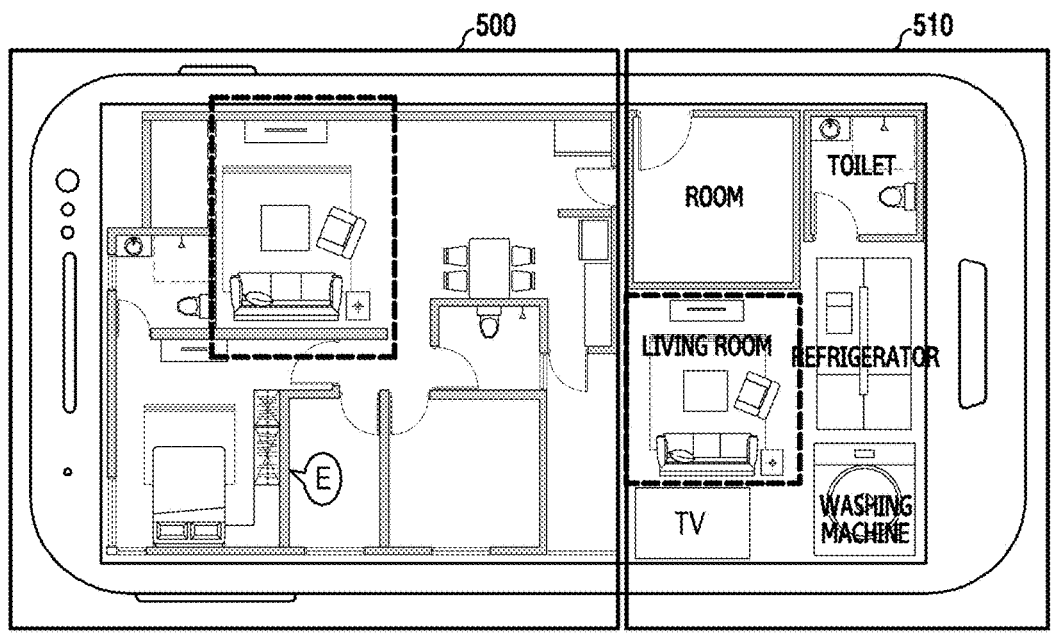
FIG. 5 illustrates a screen construction for displaying a space drawing visualizing a specific (indoor) space and a space setting list for area designation of the space drawing in an electronic device according to various embodiments of the present disclosure.

FIG. 5 illustrates a screen construction for displaying a space drawing visualizing a specific (indoor) space and a space setting list for area designation of the space drawing in an electronic device according to various embodiments of the present disclosure.

Referring to FIG. 5, for example, the electronic device may execute a home application and display the space drawing 500 and the space setting list 510 on a screen. The space drawing 500, the result of visualizing an indoor structure, may show divided areas for space of a room, a living room, a toilet, etc. The space setting list 510 may include an area image list (for example, a room, a living room, a toilet, etc.) for designating each area of the space drawing 500, and a device image list (for example, a TV, a refrigerator, a washing machine, etc.). However, it is not limited to this, and the space setting list 510 may further include various area image lists or device image lists.

FIGS. 6A to 6D illustrate screen constructions for arranging at least one or more device images on a space drawing using the space setting list of FIG. 5 in an electronic device according to various embodiments of the present disclosure.

Figure 6A:
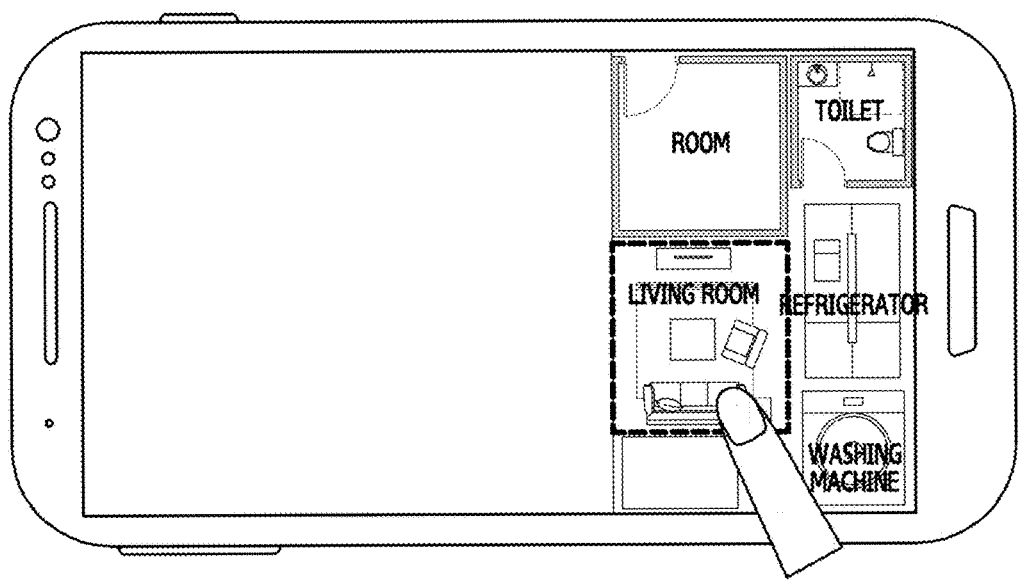
FIGS. 6A, 6B, 6C, and 6D illustrate screen constructions for arranging at least one or more device images on a space drawing using the space setting list of FIG. 5 in an electronic device according to various embodiments of the present disclosure.
Figure 6B:
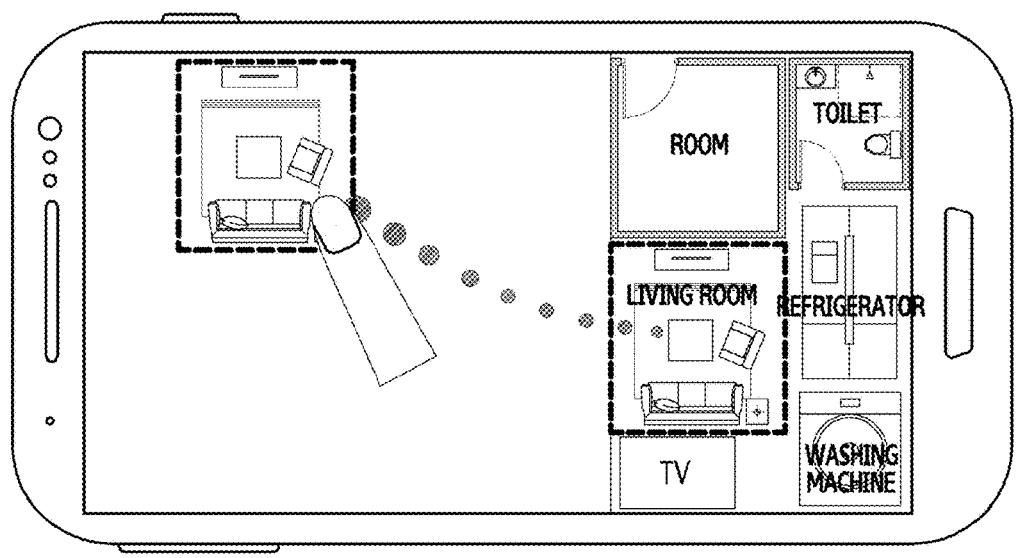
Figure 6C:
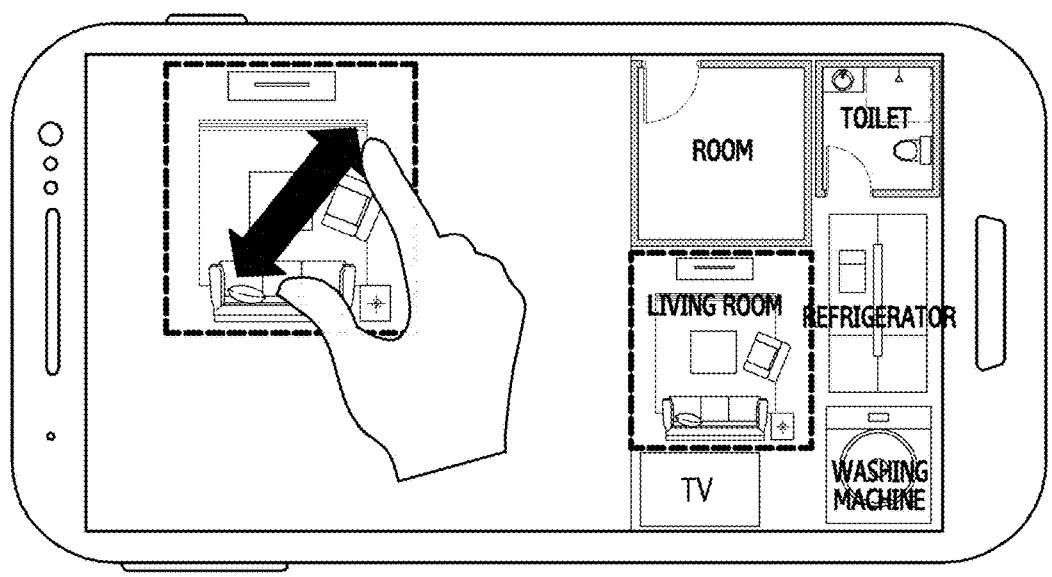
Figure 6D:
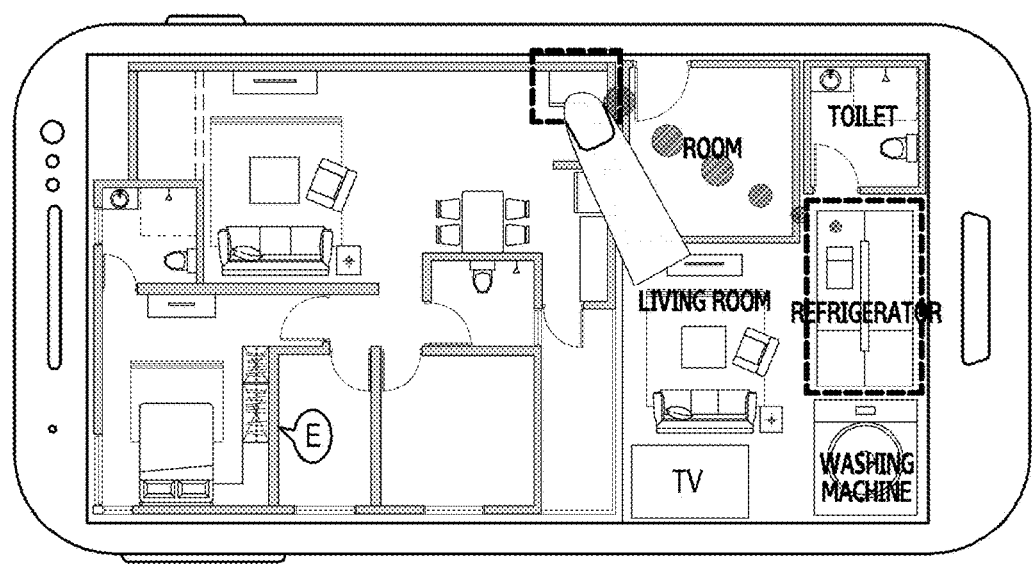

Referring to FIGS. 6A and 6B, for example, a user may select a desired area image from the space setting list 510, and drag and drop the selected area image onto the space drawing 500. Thereafter, referring to FIG. 6C, the user may adapt and adjust the area image (for example, a living room) arranged on the space drawing 500 to an indoor structure through drag, pinch-to-zoom, automatic adjustment, or vertical/horizontal surface adjustment, etc. Thereafter, referring to FIG. 6D, the user may drag and drop an arbitrary device image (for example, a refrigerator) among a device image list onto the space drawing 500. At this time, the electronic device may receive related information from other devices, which play a gateway role, such as Home sync, and arrange (i.e., display) the received related information on the space drawing 500.

Figure 7:
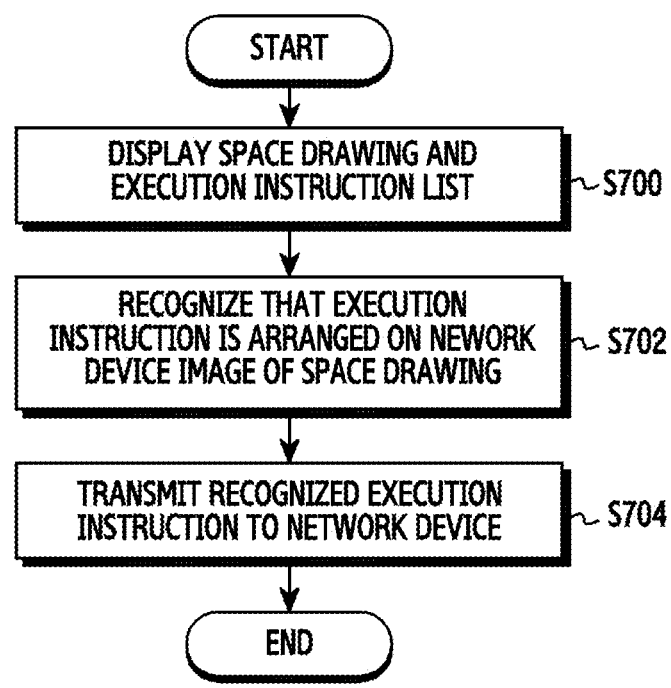
FIG. 7 is a flowchart illustrating an operation method of an electronic device for providing a network service according to various embodiments of the present disclosure.

FIG. 7 is a flowchart illustrating an operation method of an electronic device for providing a network service according to various embodiments of the present disclosure.

Figure 8:
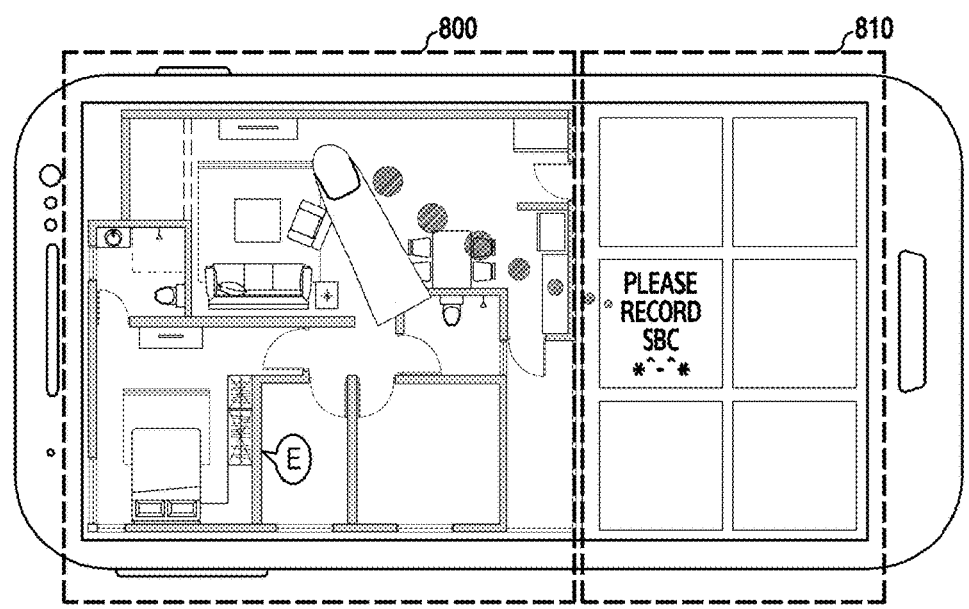
FIG. 8 illustrates a screen construction for displaying a space drawing and an execution instruction list according to various embodiments of the present disclosure.

FIG. 8 illustrates a screen construction for displaying a space drawing and an execution instruction list according to various embodiments of the present disclosure.

Referring to FIG. 7, in operation 700, the electronic device may display a space drawing visualizing a specific space (i.e., an indoor space), and an execution instruction list for a network service.

Referring to FIG. 8, for example, a space drawing 800 may include images of divided areas of an indoor space and images of network devices located within these divided areas. An execution instruction list 810 may include (i.e., display) a list (i.e., an icon list) of execution instructions for the network devices arranged on the space drawing 800. The execution instruction list 810, may include a message (for example, "Please record broadcasting") to be forwarded to the network device. According to an embodiment of the present disclosure, the areas of the space drawing 800 and the execution instruction list 810 may be divided and displayed on a display screen of the electronic device. That is, as illustrated in FIG. 8, the display areas of the space drawing 800 and the execution instruction list 810 may be divided and displayed on the display screen of the electronic device. Also, the sizes of the display areas of the space drawing 800 and the execution instruction list 810 on the display screen are possible to be mutually adjusted. That is, the sizes of the display areas of the space drawing 800 and the execution instruction list 810 may be adjusted according to an indoor structure through drag, pinch-to-zoom, automatic adjustment, or vertical/horizontal surface adjustment.

In operation 702, the electronic device may recognize that the execution instruction icon selected among the displayed execution instruction list is arranged (or overlapped) on images of at least one or more network devices displayed on the space drawing. For example, the electronic device may recognize that the execution instruction icon selected by a user is arranged (or overlapped) on the network device image of the space drawing through drag-and-drop. According to an embodiment of the present disclosure, the electronic device may recognize that the execution instruction icon is arranged (or overlapped) on the image of the network device, by sensing a (starting) point where the execution instruction icon is selected (touched) among the execution instruction list and a (ending) point where the execution instruction icon is selection released (touch released) on the image of the network device of the space drawing.

As illustrated in FIG. 8, for example, the electronic device may recognize that a message (for example, "Please record broadcasting") corresponding to one example of the execution instruction (icon) included in the execution instruction list 810 is arranged (or overlapped) on the network device image of the space drawing 800 through drag-and-drop. According to various embodiments of the present disclosure, the network device (image) included within the aforementioned space drawing may also include a gateway (image) existing within an indoor space. Accordingly, the electronic device may also recognize that the message being one example of the execution instruction icon is arranged (or overlapped) on a gateway image of the space drawing 800.

Various embodiments of an operation of recognizing that the execution instruction icon is arranged on the network device image will be described with reference to FIG. 12 later.

In operation 704, the electronic device may transmit the recognized execution instruction (icon) to the network device. If recognizing that the execution instruction icon selected by the user is arranged (overlapped) on the network device image of the space drawing through drag-and-drop, the electronic device may transmit an execution instruction corresponding to the recognized execution instruction icon, to the network device corresponding to the image (i.e., network device image) on the space drawing.

According to an embodiment of the present disclosure, the network device (image) may also include a gateway (image) existing within an indoor space. Accordingly, as illustrated in FIG. 8, if recognizing that a message, being one example of the execution instruction icon, is arranged (overlapped) on the gateway image of the space drawing 800, the electronic device may transmit identification information of a user who is located within the indoor space and execution instruction priority order information about a network device adjacent to the user, together with the message, to the gateway. Here, the user identification information may, for example, include a phone number of a portable terminal possessed by the user, or network address information, etc. Also, the execution instruction priority order information may be order information for preferentially performing an execution instruction among network devices adjacent to the user. For example, in case that the user is sitting in a living room, the execution instruction priority order information represents order of execution of operations of a network smart TV, or a network audio device, etc. adjacent to the user.

According to various embodiments of the present disclosure, the electronic device may display a list of at least one or more network devices for transmitting a selected execution instruction (icon). For example, if the user selects one execution instruction (icon) among the execution instruction list, the electronic device may output (display) a list of at least one network device such that the user may select the at least one network device to which the execution instruction is to be transmitted. If the user selects the at least one network device among the list of the at least one network device, the electronic device may display to arrange (overlap) the selected execution instruction icon on at least one network device image. The electronic device may transmit the selected execution instruction to the at least one network device selected by the user.

Figure 9A:
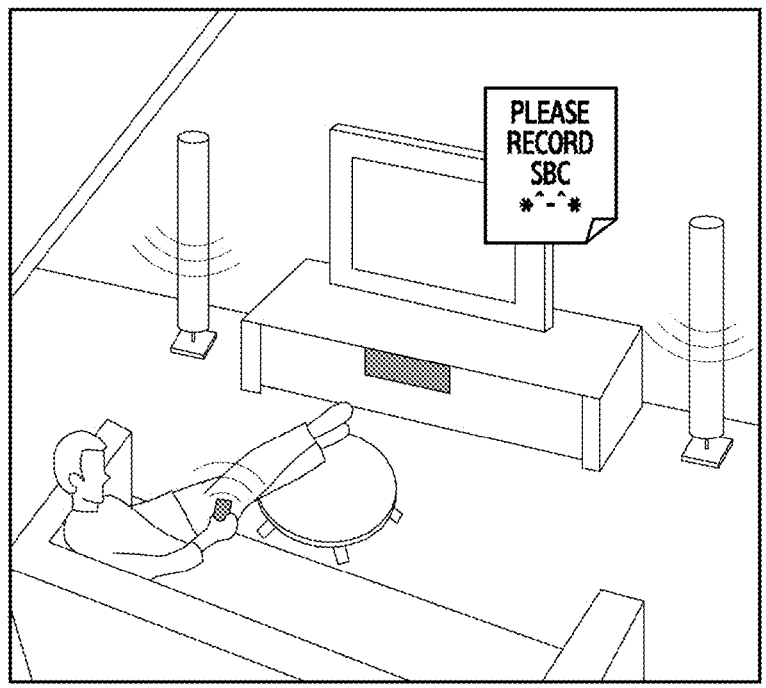
FIGS. 9A and 9B illustrate examples of transmitting a message corresponding to an execution instruction to a network device adjacent to an indoor user in an electronic device according to various embodiments of the present disclosure.
Figure 9B:
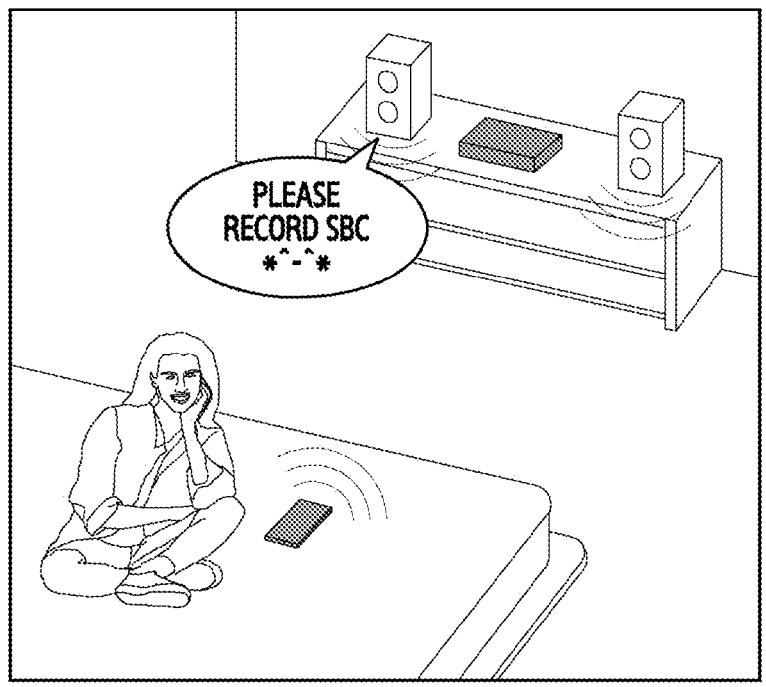

FIGS. 9A and 9B illustrate examples of transmitting a message corresponding to an execution instruction to a network device adjacent to an indoor user in an electronic device according to various embodiments of the present disclosure.

Referring to FIG. 9A, for example, the electronic device may transmit a message (i.e., an execution instruction) to a network smart TV placed in a living room where a user is located, and may display the message on a display screen of the corresponding network smart TV. Alternatively, referring to FIG. 9B, the electronic device may transmit a message (i.e., an execution instruction) to a network audio device placed in the living room where the user is located, and the network audio device may output the message through a screen of the network audio device or output a voice corresponding to the message.

Figure 10:
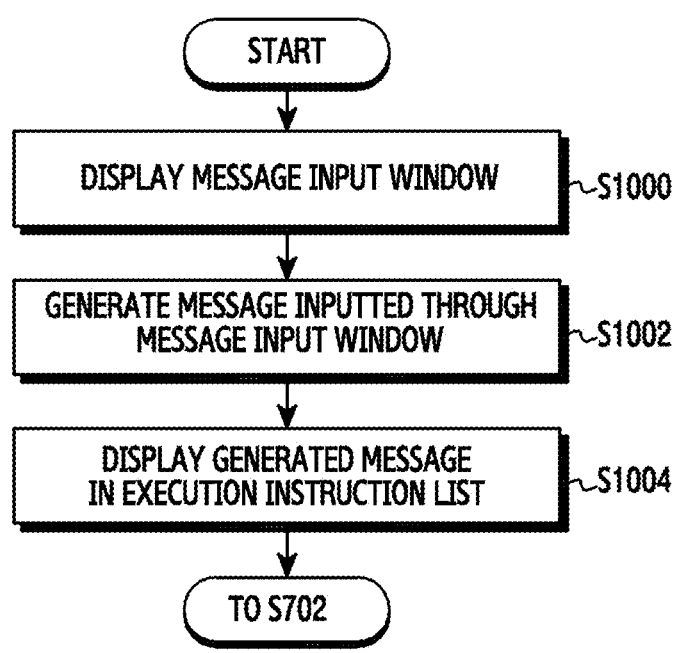
FIG. 10 is a flowchart illustrating an operation method of an electronic device for displaying an execution instruction list according to various embodiments of the present disclosure.

FIG. 10 is a flowchart illustrating an operation method of an electronic device for displaying an execution instruction list according to various embodiments of the present disclosure.

Figure 11:
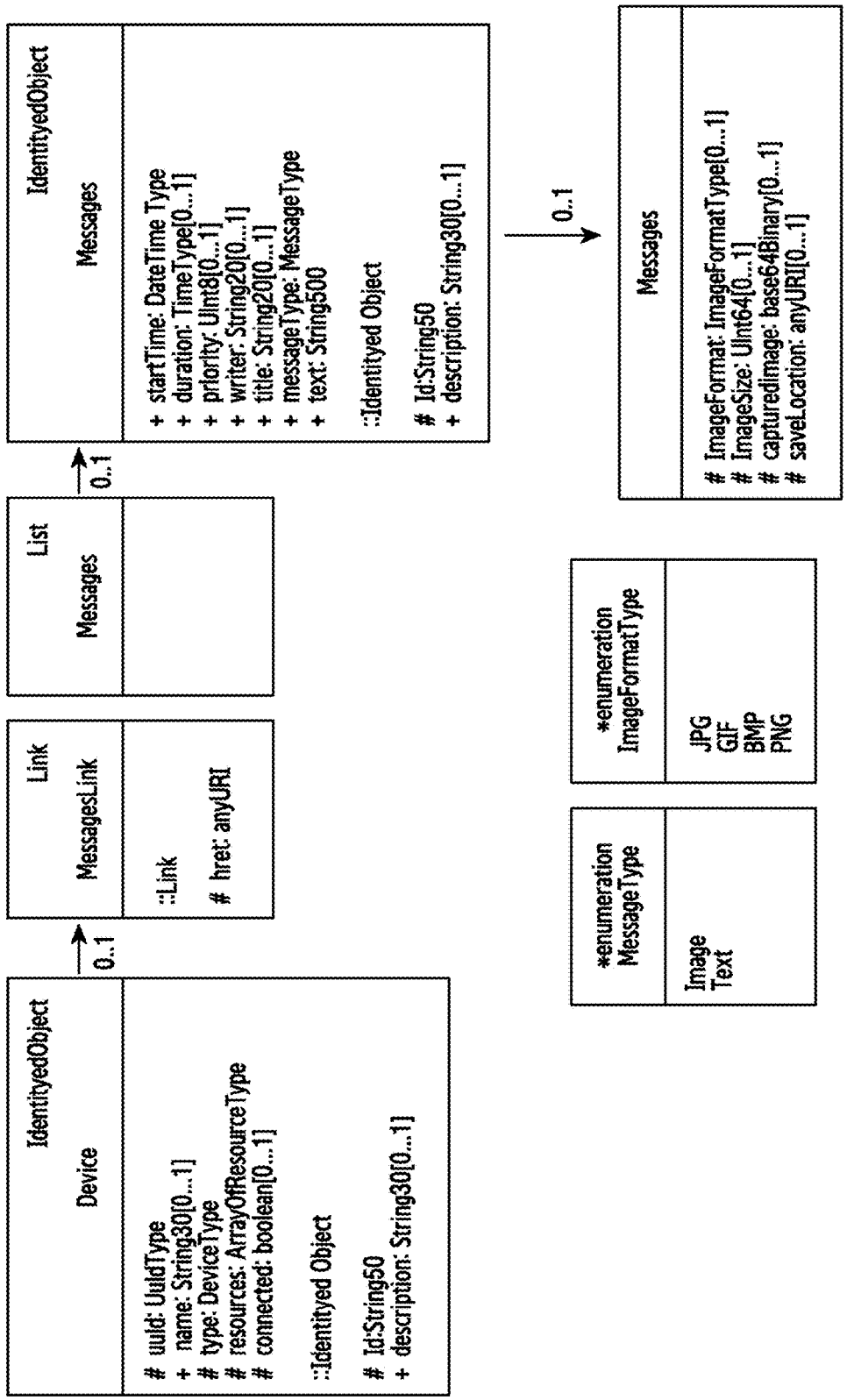
FIG. 11 illustrates an example of an operation of generating a message inputted through a message input window in an electronic device according to various embodiments of the present disclosure.

FIG. 11 illustrates an example of an operation of generating a message inputted through a message input window in an electronic device according to various embodiments of the present disclosure.

Referring to FIG. 10, in operation 1000, the electronic device may display a message input window. For example, the electronic device may display the message input window for generating a message (i.e., an execution instruction) to be forwarded to a network device, on a display screen of the electronic device.

In operation 1002, the electronic device may generate a message (or a memo) inputted through the displayed message input window. Referring to FIG. 11, the electronic device may generate a message of a text format or a message of an image format, based on message (i.e., memo) content inputted through the message input window.

In operation 1004, the electronic device may display the generated message in the execution instruction list. The generated message is one example of the aforementioned execution instruction, and the electronic device may display the generated message in the execution instruction list of a screen of the electronic device. Here, the generated message may be an icon, a symbol, or an image. For example, as illustrated in FIG. 8, the message (for example, "Please record broadcasting") corresponding to the execution instruction may be displayed in the execution instruction list 810.

Figure 12:
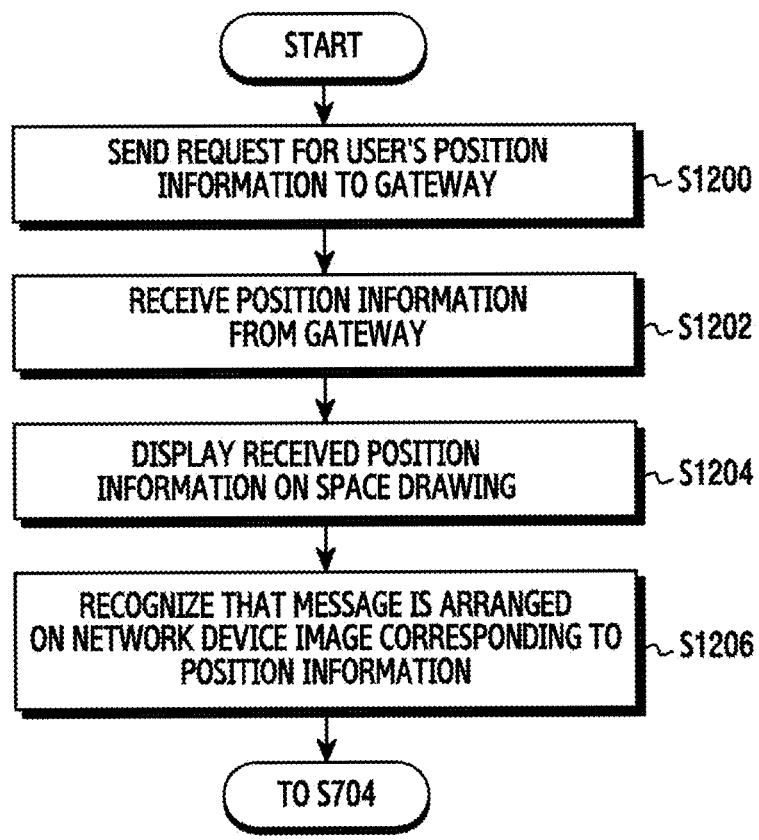
FIG. 12 is a flowchart illustrating an operation method of an electronic device for recognizing that an execution instruction is arranged on a network device image according to various embodiments of the present disclosure.

FIG. 12 is a flowchart illustrating an operation method of an electronic device for recognizing that an execution instruction is arranged on a network device image according to various embodiments of the present disclosure.

Referring to FIG. 12, in operation 1200, the electronic device may send a gateway a request for user's position information. For example, the electronic device may send a request for position information of a user who is located in an indoor space, to the gateway existing within an indoor space. The electronic device may transmit user identification information including a phone number of a portable terminal possessed by the user, or network address information, etc., together with a position information request signal, to the gateway.

In operation 1202, the electronic device may receive the user's position information from the gateway in response to the position information request of the electronic device. For example, after detecting a user's position corresponding to user identification information, the gateway may transmit the user's position information to the electronic device. The electronic device may receive the user's position information from the gateway.

In operation 1204, the electronic device may display the received position information on the space drawing. For example, the electronic device may display the user's position on the space drawing, on the basis of the received user's position information. The displayed user position may be an icon, a symbol, or a specific image.

In operation 1206, the electronic device may recognize that a generated message is arranged on an image of a network device corresponding to the displayed position information. For example, the electronic device may generate the message based on data inputted through a message input window, and display the generated message. Thereafter, if the user of the electronic device drags and drops the displayed (generated) message onto a corresponding image indicating a position of the indoor user on the space drawing, the electronic device may recognize that the message is arranged on the corresponding image. Thereafter, the electronic device may transmit the generated message to a network device corresponding to the displayed position information.

Figure 13:
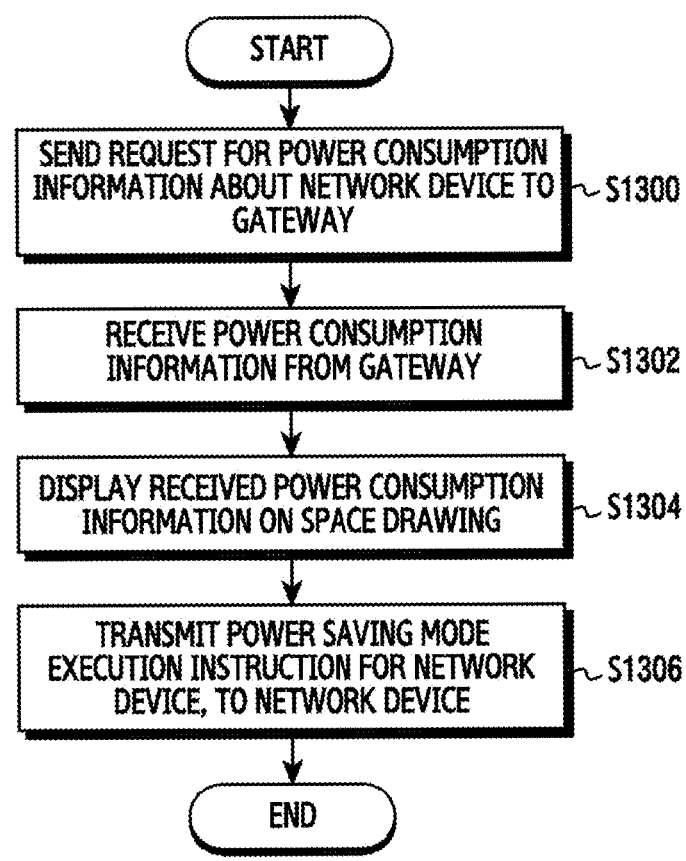
FIG. 13 is a flowchart illustrating an operation method of an electronic device for transmitting an execution instruction to a network device according to various embodiments of the present disclosure.

FIG. 13 is a flowchart illustrating an operation method of an electronic device for transmitting an execution instruction to a network device according to various embodiments of the present disclosure.

Figure 14:
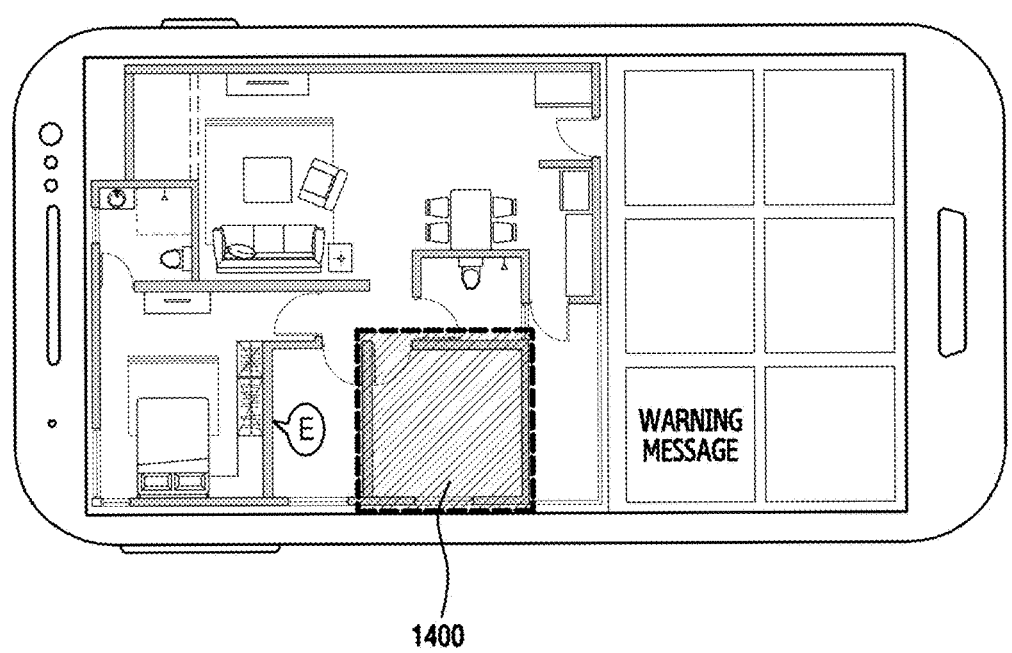
FIG. 14 illustrates a screen construction for displaying power consumption information on a space drawing in an electronic device according to various embodiments of the present disclosure.

FIG. 14 illustrates a screen construction for displaying power consumption information on a space drawing in an electronic device according to various embodiments of the present disclosure.

Referring to FIG. 13, in operation 1300, the electronic device may send a gateway a request for power consumption information of a network device. For example, the gateway may have a power sensing and controller capable of sensing each of power consumptions of network devices existing indoors. According to this, the gateway may collect information about the power consumptions from the respective network devices. That is, the electronic device may send a request for power consumption information to the gateway capable of collecting the power consumption information of the network device.

In operation 1302, the electronic device may receive the power consumption information from the gateway. For example, if the gateway collects and transmits the power consumption information of the network devices to the electronic device, the electronic device may receive the power consumption information from the gateway and store the received power consumption information.

In operation 1304, the electronic device may display the received power consumption information on the space drawing. Referring to FIG. 14, for example, the electronic device may display the power consumption information of each network device received from the gateway, on each network device image displayed on the space drawing.

At this time, the electronic device may distinguish power consumption by a color, a shade, a slash, a text, or an image, etc. and display (1400) the distinguished power consumption on the space drawing. Also, the electronic device may display on the space drawing a warning message for warning to an area of large power consumptions.

In operation 1306, the electronic device may transmit a power saving mode enable instruction for the network device, to the network device. For example, as illustrated in FIG. 14, the electronic device may transmit the power saving mode enable instruction to a network device corresponding to an area where a warning of power consumption is displayed.

Figure 15A:
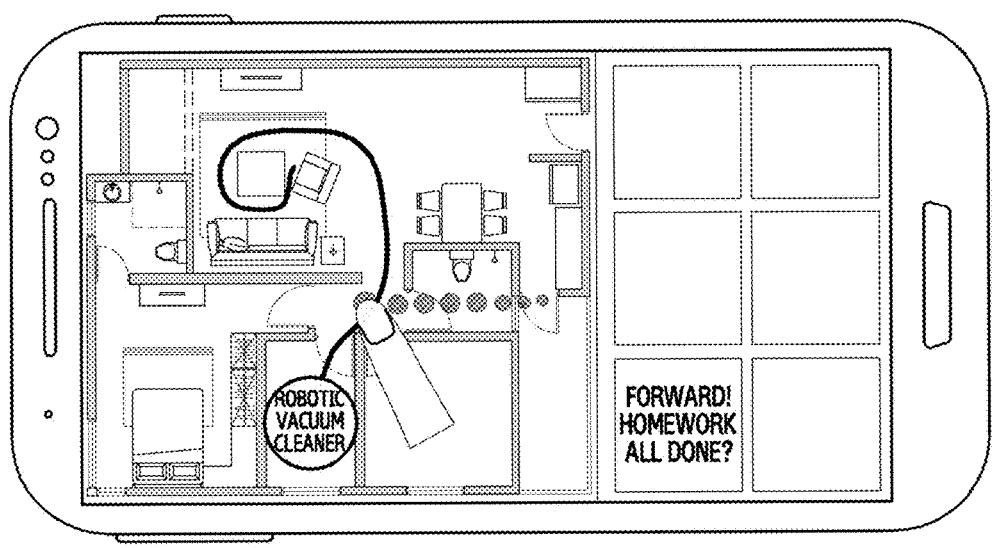
FIGS. 15A and 15B illustrate screen constructions for providing a network service in an electronic device according to various embodiments of the present disclosure.
Figure 15B:
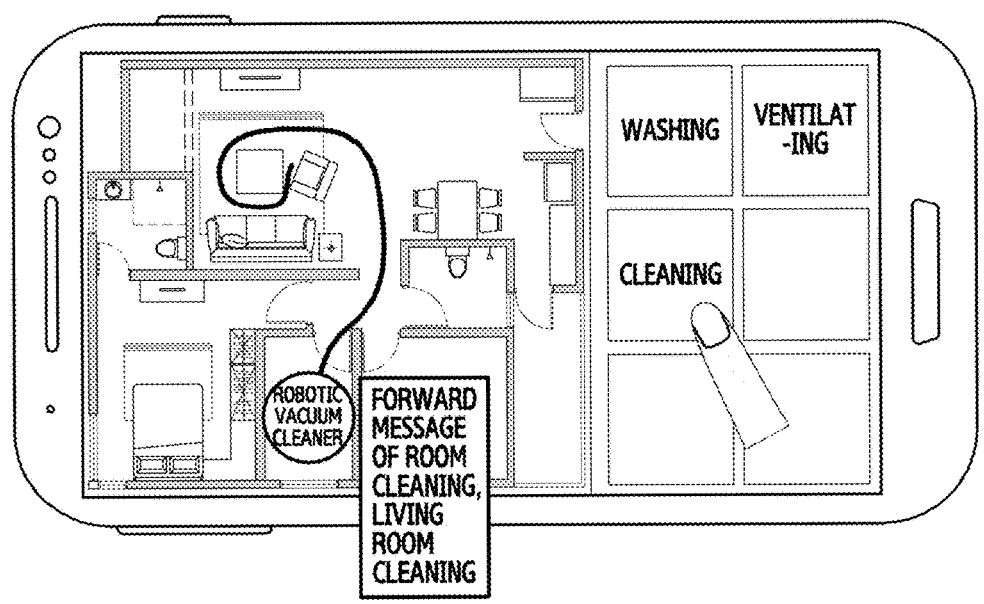

FIGS. 15A and 15B illustrate screen constructions for providing a network service in an electronic device according to various embodiments of the present disclosure.

Referring to FIG. 15A, no network device to which the electronic device is to forward an execution instruction (for example, a message, etc.) may exist around an indoor user. In this case, the electronic device may drag and drop a message (icon) displayed on a screen onto an image of a network device (for example, a robotic vacuum cleaner) of a space drawing, and may receive an input of designating a movement path of the robotic vacuum cleaner. Also, referring to FIG. 15B, the electronic device may set and display a repeated execution instruction (icon) for what to have to do on the screen. If recognizing that the displayed execution instruction icon is selected and arranged (overlapped) on a network device image of the robotic vacuum cleaner, or a washing machine, etc. displayed on the space drawing, the electronic device may forward a message corresponding to the selected execution instruction icon to the network device such as the robotic vacuum cleaner, or the washing machine, etc. According to various embodiments of the present disclosure, if the electronic device receives a selection of a robotic vacuum cleaner (image) and receives a selection (touch) of an execution instruction (icon) 'clean' displayed on the screen, the electronic device may transmit a message corresponding to the selected execution instruction icon 'clean' to the robotic vacuum cleaner. According to this, the robotic vacuum cleaner may recognize a word 'cleaning' included in the received message, and begin to clean. For example, the electronic device may previously receive an input of a movement path of the robotic vacuum cleaner, and instruct the robotic vacuum cleaner to do cleaning along the movement path as well. Also, if a user touches the robotic vacuum cleaner (image) on the space drawing of the electronic device, the electronic device may use a drop menu, etc., to display a list for enabling the robotic vacuum cleaner. For example, in case that laundry is put in the washing machine, the user may transmit an execution instruction (message) 'wash' to the washing machine before going home, to enable the washing machine to execute a corresponding operation (washing).

Figure 16:
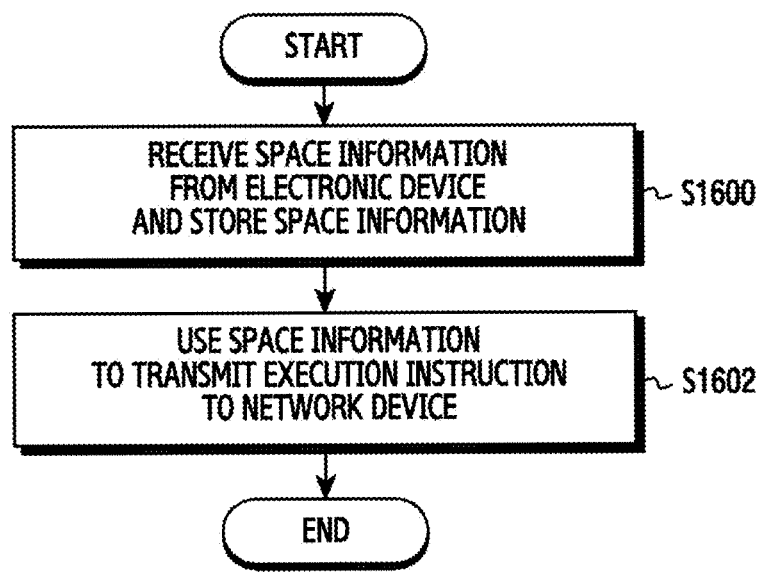
FIG. 16 is a flowchart illustrating an operation method of a gateway for providing a network service according to various embodiments of the present disclosure.

FIG. 16 is a flowchart illustrating an operation method of a gateway for providing a network service according to various embodiments of the present disclosure.

Referring to FIG. 16, in operation 1600, the gateway may receive space information from an electronic device and store the space information. For example, the gateway may receive the space information, which arranges images of at least one or more network devices on a space drawing visualizing an indoor space, from the electronic device, and store the received space information. For example, as illustrated in FIGS. 6A to 6D, the space information may be adjusted by dragging and dropping a list selected among the space setting list 510 to the space drawing 500. Also, the space information may be adjusted by dragging and dropping a network device image (for example, a refrigerator), which is selected among network device images included in the space setting list 510, to the space drawing 500. In operation 1602, the gateway may use the space information to transmit an execution instruction to a network device. For example, the gateway may receive an execution instruction for a network service from the electronic device, and may use the space information stored in the gateway to transmit the received execution instruction to the network device.

Figure 17:
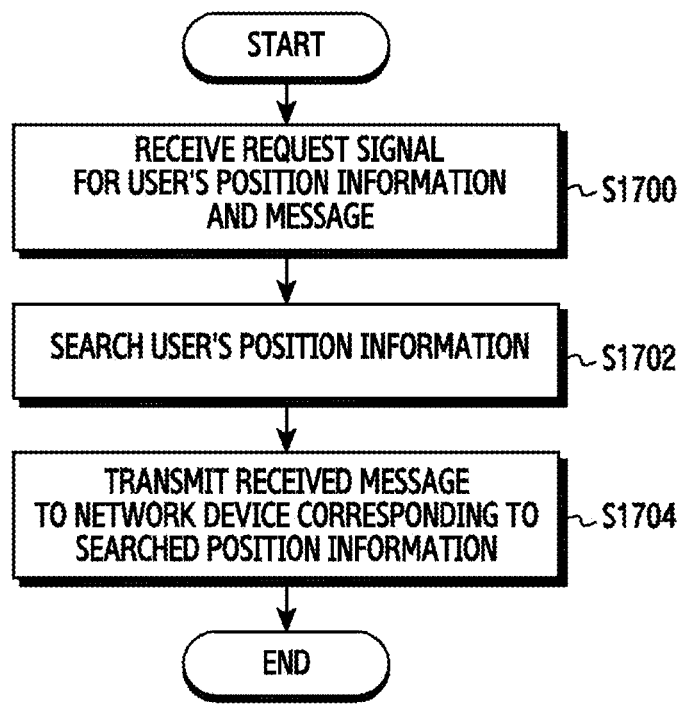
FIG. 17 is a flowchart illustrating an operation method of a gateway for transmitting an execution instruction to a network device using space information according to various embodiments of the present disclosure.

FIG. 17 is a flowchart illustrating an operation method of a gateway for transmitting an execution instruction to a network device using space information according to various embodiments of the present disclosure.

Referring to FIG. 17, in operation 1700, the gateway may receive a request signal for user's position information and a message (i.e., an execution instruction). For example, the gateway may receive the request signal for the position information of a user who is located in an indoor space and a message for transmitting to a corresponding network device, from an electronic device. At this time, the gateway may receive identification information for identifying the user (for example, a phone number of a portable terminal possessed by the user, or network address information, etc.) together with the request signal for the user's position information, from the electronic device.

In operation 1702, the gateway may search the user's position information in response to the received request signal for the user's position information. For example, the gateway may use the user's identification information, that is, execution information about a portable terminal of an indoor user to search a user's position, or may use a user sensing signal of a sensing device existing in the indoor space to detect the user's position. Here, the sensing device may include a sensing sensor for sensing a user's motion, a camera, a beacon signal sensing device, a Bluetooth signal sensing device, or an ultrasonic signal sensing device, etc. Accordingly, the gateway may use the sensing signals of these sensing devices, i.e., a user motion sensing signal, a user image signal, a beacon sensing signal, a Bluetooth sensing signal (i.e., a received signal strength indicator (RSSI) value), or an ultrasonic sensing signal, to detect the user's position.

In operation 1704, the gateway may transmit the received message to a network device corresponding to the searched position information. For example, if detecting the user's position information, the gateway may search a network device, which is arranged or adjacent to the corresponding position information, and transmit the received message to the corresponding network device.

Figure 18:
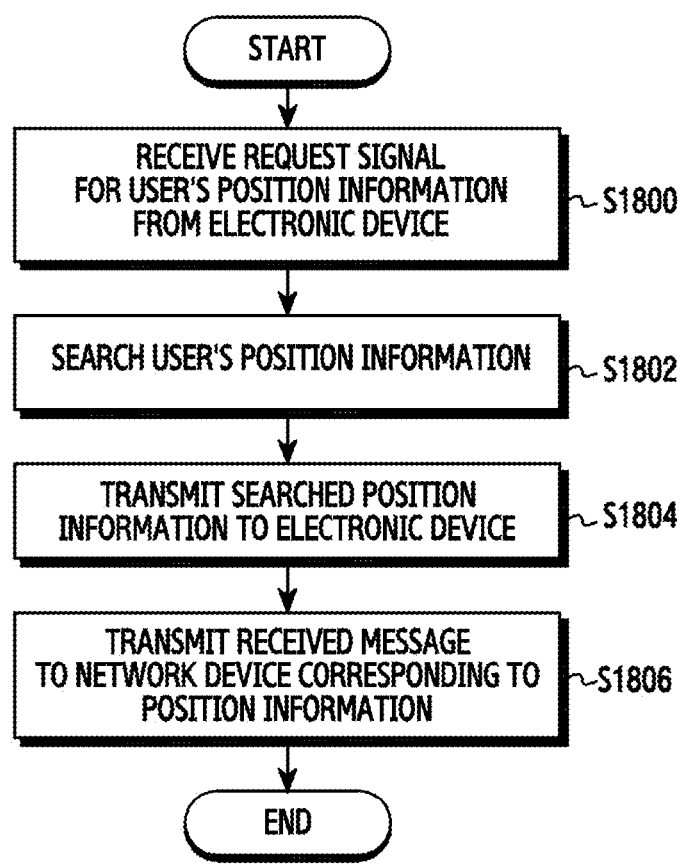
FIG. 18 is a flowchart illustrating an operation method of a gateway for transmitting an execution instruction to a network device using space information according to various embodiments of the present disclosure.

FIG. 18 is a flowchart illustrating an operation method of a gateway for transmitting an execution instruction to a network device using space information according to various embodiments of the present disclosure.

Referring to FIG. 18, in operation 1800, the gateway may receive a request signal for user's position information from an electronic device. For example, the gateway may receive the request signal for the position information of a user who is located in an indoor space from the electronic device. As mentioned above, the gateway may receive the identification information for identifying the user, together with the request signal for the user's position information. In operation 1802, in response to the request signal for the user's position information, the gateway may search the user's position information. As mentioned above, the gateway may use execution information about the user's identification information or a user sensing signal of a sensing device, to detect the user's position information.

In operation 1804, the gateway may transmit the searched user's position information to the electronic device.

In operation 1806, the gateway may transmit a message received from the electronic device, to a network device corresponding to the searched position information. For example, if receiving a message for transmitting to a specific network device from the electronic device, the gateway may transmit the message to the network device corresponding to the searched position information. The gateway may search a network device, which is arranged or adjacent to the corresponding position information, and transmit the received message to the corresponding network device.

Figure 19:
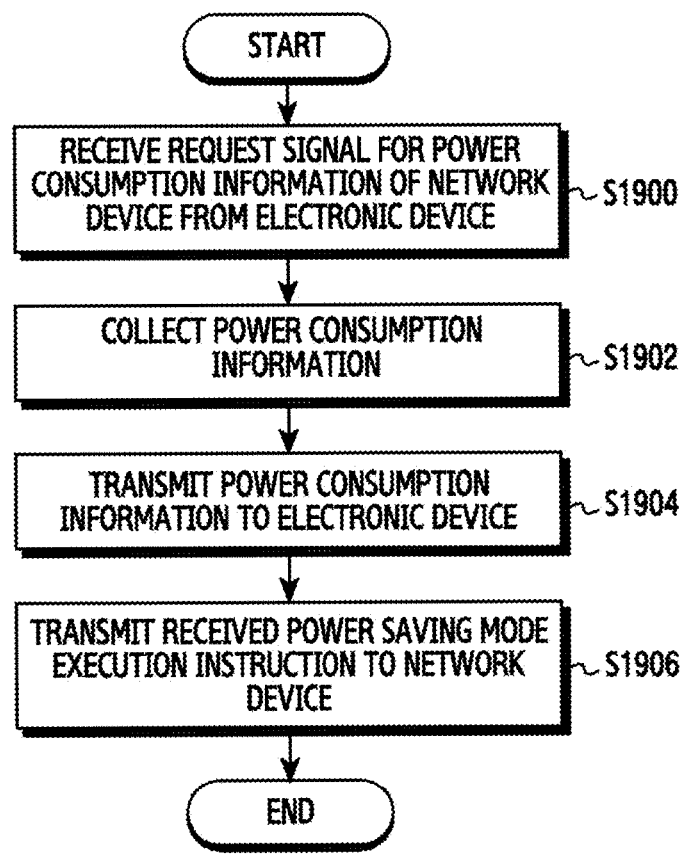
FIG. 19 is a flowchart illustrating an operation method of a gateway for transmitting an execution instruction to a network device using space information according to various embodiments of the present disclosure.

FIG. 19 is a flowchart illustrating an operation method of a gateway for transmitting an execution instruction to a network device using space information according to various embodiments of the present disclosure.

Referring to FIG. 19, in operation 1900, the gateway may receive a request signal for power consumption information of a network device, from an electronic device. For example, the gateway may receive the request signal for the power consumption information of the network device existing indoors, from the electronic device establishing communication. In operation 1902, the gateway may collect the power consumption information of the network device. For example, the gateway may have a power sensing and controller capable of sensing power consumption for each of network devices existing indoors. In this case, the gateway may collect information of the power consumption from the respective network devices.

In operation 1904, the gateway may transmit the collected power consumption information to the electronic device.

In operation 1906, the gateway may receive a power saving mode enable instruction for the network device from the electronic device, and may transmit the received power saving mode enable instruction to the corresponding network device. For example, as illustrated in FIG. 14, if receiving a power saving mode enable instruction for an area where a warning for power consumption is displayed, the gateway may transmit the power saving mode enable instruction to a network device corresponding to the corresponding area. According to this, the network device receiving the power saving mode enable instruction may convert into a power saving mode.

Figure 20:
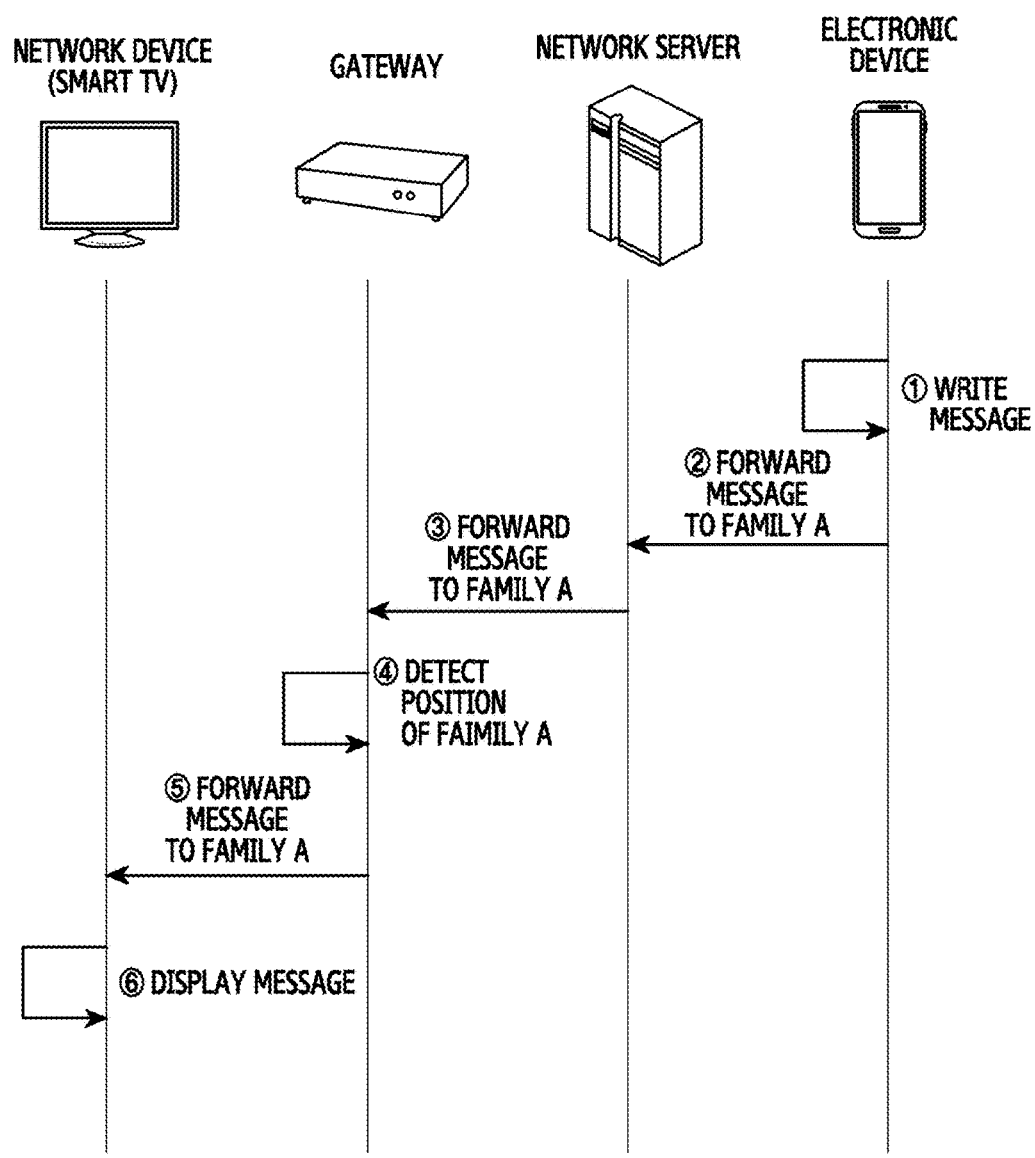
FIG. 20 illustrates a procedure for transmitting a generated message to a network device through a gateway in an electronic device according to various embodiments of the present disclosure.

FIG. 20 illustrates a procedure for transmitting a generated message to a network device through a gateway in an electronic device according to various embodiments of the present disclosure.

Referring to in FIG. 20, the electronic device may generate a message, and transmit to the gateway through a network server a signal for requesting to transmit the generated message to a family A. The gateway may detect a position of the family A and, on the basis of detected position information, may transmit the message to a network device (for example, a smart TV) in which the family A is located or which is adjacent to the family A. The network device (for example, smart TV) receiving the message may output (display) the received message.

Figure 21:
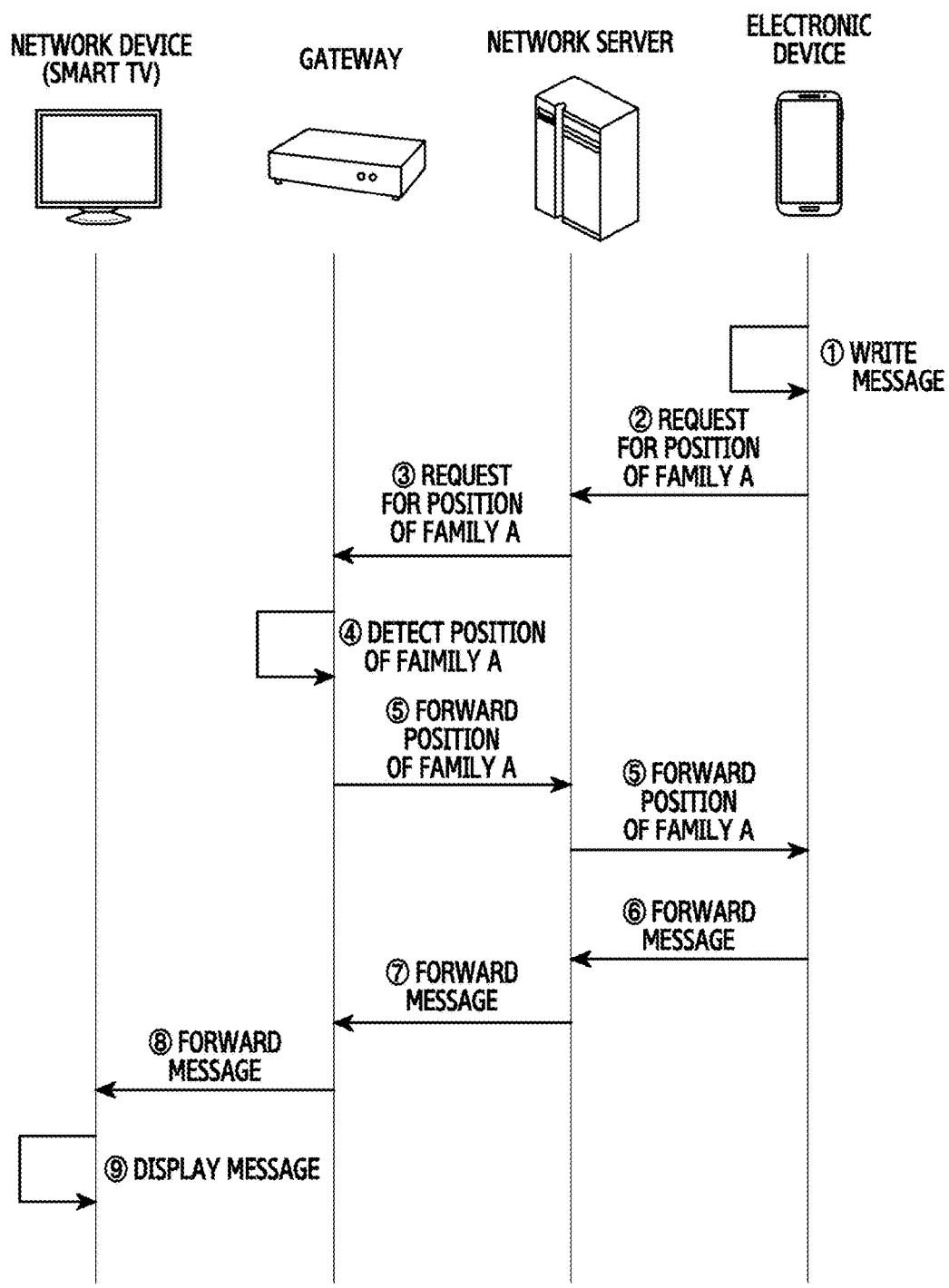
FIG. 21 illustrates a procedure for transmitting a generated message to a network device through a gateway in an electronic device according to various embodiments of the present disclosure.

FIG. 21 illustrates a procedure for transmitting a generated message to a network device through a gateway in an electronic device according to various embodiments of the present disclosure.

Referring to FIG. 21, after generating a message, the electronic device may send a request for position information about a family A, to a gateway through a server. If the request signal for the position information is transmitted to the gateway through the network server, the gateway may detect a position of the family A, and transmit detected position information to the electronic device through the network server. Thereafter, the electronic device may send a request for transmitting the message to a network device (for example, smart TV) in which the family A is located or which is adjacent to the family A on the basis of the received position information about the family A, to the gateway through the network server. In response to the request of the electronic device, the gateway may transmit the message to the network device (for example, smart TV) in which the family A is located or which is adjacent to the family A. The network device (for example, the smart TV) receiving the message may output (display) the received message.

Figure 22:
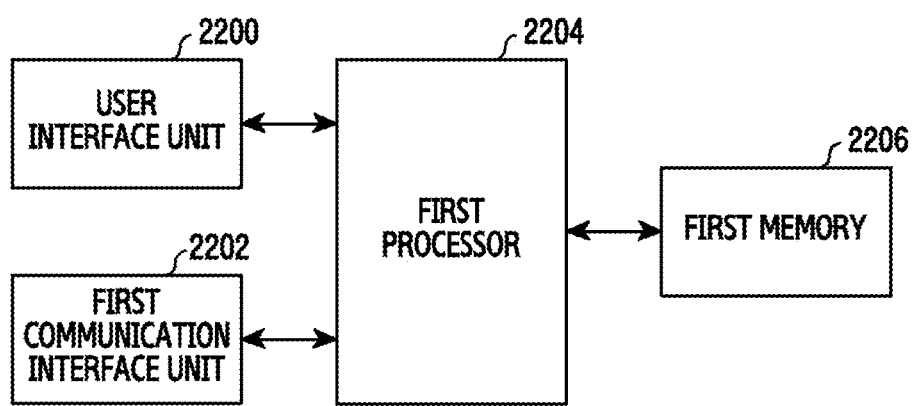
FIG. 22 is a block diagram of an electronic device for providing a network service according to various embodiments of the present disclosure.

FIG. 22 is a block diagram of an electronic device for providing a network service according to various embodiments of the present disclosure.

Referring to FIG. 22, the electronic device may include a user interface unit 2200, a first communication interface unit 2202, a first processor 2204, and a first memory 2206.

The user interface unit 2200 may display a space drawing visualizing a specific space (i.e., an indoor space) and an execution instruction list for a network service. For example, the user interface unit 2200 may display the space drawing and the execution instruction list in divided areas on the display screen. Also, the user interface unit 2200 may adjust the size of at least any one of the space drawing and the execution instruction list and display the size-adjusted at least any one of the space drawing and the execution instruction list on the display screen.

For example, as illustrated in FIG. 8, the user interface unit 2200 may distinguish areas for the space drawing 800 and the execution instruction list 810 and display the space drawing 800 and the execution instruction list 810 in the distinguished areas on the display screen. Also, the user interface unit 2200 may control the sizes of the display areas of the space drawing 800 and the execution instruction list 810 on the display screen. The user interface unit 2200 may adjust the display areas of the space drawing 800 and the execution instruction list 810 through drag, pinch-to-zoom, automatic adjustment, or vertical/horizontal surface adjustment.

The user interface unit 2200 may display a message input window for generating a message to be forwarded to a network device on the display screen, and generate the message inputted through the message input window. The user interface unit 2200 may display the generated message in the execution instruction list by an icon, a symbol, a specific image, etc.

As illustrated in FIG. 11, the user interface unit 2200 may generate a message of a text format for inputted message (memo) content or generate a message of an image format for the inputted message (memo) content. Thereafter, the user interface unit 2200 may display the generated message in the execution instruction list.

The user interface unit 2200 may recognize that an execution instruction (icon) selected among the displayed execution instruction list is arranged (overlapped) on images of at least one or more network devices displayed on the space drawing. The user interface unit 2200 may recognize that the execution instruction (icon) is arranged on the image of the network device through drag-and-drop. For example, as illustrated in FIG. 8, the user interface unit 2200 may recognize that a message (for example, "Please record broadcasting") being one example of the execution instruction (icon) is arranged on the network device image on the space drawing 800 through drag-and-drop.

According to various embodiments of the present disclosure, assuming that the network device includes a gateway existing in an indoor space, the user interface unit 2200 may recognize that a generated message is arranged on a gateway image of the space drawing. For example, the first processor 2204 may send a request for position information of a user who is located in the indoor space, to the gateway existing within the indoor space. At this time, the first processor 2204 may transmit user identification information (for example, a phone number of a portable terminal possessed by the user, or network address information, etc.), together with a position information request signal, to the gateway. After the gateway detects a user's position corresponding to the user identification information, if the gateway transmits a user's position information to the electronic device, the user interface unit 2200 may display the received user's position information on the space drawing. Thereafter, the user interface unit 2200 may recognize that the generated message is arranged on an image of a network device corresponding to the displayed user's position information. That is, if the user of the electronic device drags and drops the generated message onto a corresponding image representing a position of the indoor user on the space drawing, the user interface unit 2200 recognizes that the message is arranged on the corresponding image.

The first communication interface unit 2202 may connect with indoor network devices through the gateway. The first communication interface unit 2202 may transmit/receive data with the gateway. For example, the first communication interface unit 2202 may transmit an execution instruction, which is recognized in the user interface unit 2200, to the network device, and receive user's position information from the gateway.

The first processor 2204 controls operations of the user interface unit 2200 and the first communication interface unit 2202. The first processor 2204 controls to transmit identification information of a user who is located in an indoor space and execution instruction priority order information about a network device adjacent to the user, together with a generated message, to the gateway. Accordingly, according to the control of the first processor 2204, the first communication interface unit 2202 may transmit the generated message, the user identification information, and the execution instruction priority order information, etc., to the gateway. As illustrated in FIG. 8, if the first processor 2204 recognizes that a message being one example of an execution instruction is arranged on a gateway image of the space drawing 800, the first processor 2204 may transmit the identification information of the user who is located in the indoor space and the execution instruction priority order information about the network device adjacent to the user, together with the generated message, to the gateway.

Also, the first processor 2204 may send a request for position information of a user who is located in an indoor space, to a gateway existing within the indoor space. According to this, if the first processor 2204 receives the user's position information from the gateway through the first communication interface unit 2202, the first processor 2204 may display the received user's position information on the space drawing, and recognize that a generated message is arranged on a network device image corresponding to the displayed user's position information. If the first processor 2204 recognizes that the generated message is arranged on the network device image, the first processor 2204 controls to transmit the generated message to a network device corresponding to the displayed user's position information. Accordingly, according to the control of the first processor 2204, the first communication interface unit 2202 may transmit the generated message to the network device corresponding to the displayed user's position information.

According to various embodiments of the present disclosure, assuming that the network device includes a gateway existing within an indoor space, the first processor 2204 may also send a request for power consumption information of the network device, to the gateway. According to this, if the first processor 2204 receives the power consumption information of the network device from the gateway through the first communication interface unit 2202, the user interface unit 2200 may display the received power consumption information of the network device on a network device image of the space drawing.

Thereafter, the first processor 2204 may control to transmit a power saving mode enable instruction for the network device, to the network device. According to the control of the first processor 2204, the first communication interface unit 2202 may transmit a power saving mode enable instruction to the network device corresponding to the network device image of the space drawing. For example, as illustrated in FIG. 14, if the first processor 2204 recognizes that the power saving mode enable instruction is arranged in an area where a warning of power consumption is displayed, the power saving mode enable instruction may be transmitted to a network device corresponding to the corresponding area.

The first memory 2206 stores information for operations of the user interface unit 2200, the first communication interface unit 2202, and the first processor 2204. For example, the first memory 2206 stores information about the space drawing or the execution instruction list, and stores program information, control information, etc. for a processing operation of the first processor 2204.

Figure 23:
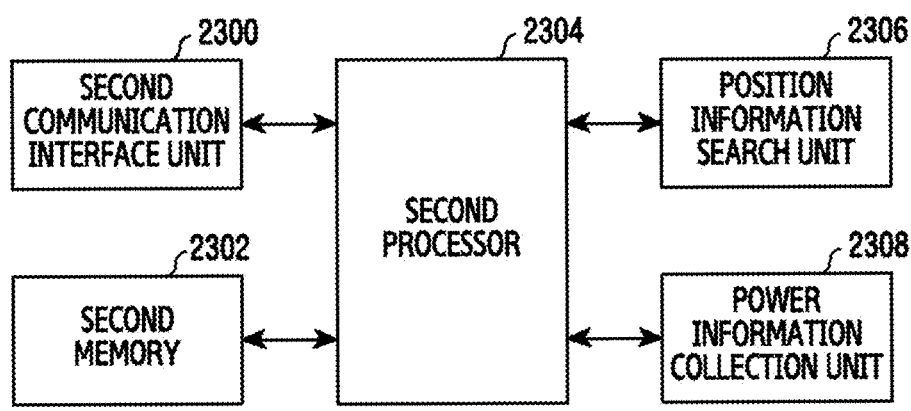
FIG. 23 is a block diagram of a gateway for providing a network service according to various embodiments of the present disclosure.

FIG. 23 illustrates a block diagram of a gateway for providing a network service according to various embodiments of the present disclosure.

Referring to FIG. 23, the gateway may include a second communication interface unit 2300, a second memory 2302, a second processor 2304, a position information search unit 2306, and a power information collection unit 2308.

The second communication interface unit 2300 may connect with an electronic device through a network server. The second communication interface unit 2300 transmits/receives data with the electronic device. For example, the second communication interface unit 2300 may receive space information arranging a network device image on a space drawing visualizing an indoor space, from the electronic device. In response to a request of the electronic device, the second communication interface unit 2300 may also transmit searched position information of an indoor user to the electronic device. Also, according to the control of the second processor 2304, the second communication interface unit 2300 may transmit an execution instruction received from the electronic device, to a network device.

For example, as illustrated in FIGS. 6A to 6D, the space information may be adjusted by dragging and dropping a list selected among the space setting list 510 onto the space drawing 500. Also, the space information may be adjusted by dragging and dropping a network device image (for example, a refrigerator), which is selected among network device images included in the space setting list 510, onto the space drawing 500. The second memory 2302 stores information for operations of the second communication interface unit 2300, the second processor 2304, the position information search unit 2306, and the power information collection unit 2308. For example, the second memory 2302 may store the space information received from the electronic device, and may store program information, control information, etc. for a processing operation of the second processor 2304.

According to an embodiment of the present disclosure, if receiving an execution instruction for a network service from the electronic device, the second processor 2304 may control to transmit the execution instruction to a corresponding network device by using the space information stored in the second memory 2302.

If receiving a request signal for position information of a user who is located in the indoor space and a message for forwarding to the network device, from the electronic device, the position information search unit 2306 searches the user's position information in response to the request signal of the electronic device. For example, the position information search unit 2306 may use at least one or more of execution information about a portable terminal of the user and a user sensing signal of a sensing device existing in the indoor space, to search the user's position information. The position information search unit 2306 may include a user-motion sensing sensor, a camera, a beacon signal sensing device, a Bluetooth signal sensing device, or an ultrasonic signal sensing device, etc. The position information search unit 2306 may sense signals of at least any one or more of user motion sensing, user image sensing, beacon signal sensing, Bluetooth signal sensing, and ultrasonic signal sensing.

According to this, the second processor 2304 may control to transmit a received message to a network device corresponding to the searched user's position information. According to the control of the second processor 2304, the second communication interface unit 2300 may transmit the received message to the network device corresponding to the searched user's position information.

According to various embodiments of the present disclosure, the second processor 2304 may also control to transmit the searched user's position information to the electronic device. According to this, the second communication interface unit 2300 may transmit the detected user's position information to the electronic device. For example, if the second processor 2304 receives a message for forwarding to a network device, from the electronic device, the second processor 2304 may control to transmit the received message to a network device corresponding to the searched user's position information. According to this, the second communication interface unit 2300 may transmit the received message to the network device corresponding to the user's position information.

If receiving a request signal for power consumption information of a network device from the electronic device, the power information collection unit 2308 collects the power consumption information of the network device. For example, each of the network devices existing indoors may have a power sensing and controller capable of sensing power consumption, and the power information collection unit 2308 may collect power consumption information from the respective network devices.

According to an embodiment of the present disclosure, the second processor 2304 may control to transmit the collected power consumption information to the electronic device. In accordance with the control of the second processor 2304, the second communication interface unit 2300 may transmit the collected power consumption information to the electronic device. Thereafter, if the second processor 2304 receives a power saving mode enable instruction for a network device from the electronic device, the second processor 2304 may control to transmit the power saving mode enable instruction to the corresponding network device. That is, the second communication interface unit 2300 may transmit the received power saving mode enable instruction to the corresponding network device. The network device receiving the power saving mode enable instruction from the interface unit 2300 may convert into a power saving mode corresponding to the power saving mode enable instruction.

Various embodiments may provide a network service to a plurality of network devices in a user-friendly and integrated user interface environment. For example, various embodiments may forward a message, a memo, etc. to the network device in an electronic device, and may easily control an operation of at least one network device in one screen of the electronic device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of operating an electronic device, the method comprising:
    displaying a space drawing visualizing an indoor space and at least one icon related to at least one message to be transmitted to at least one of a plurality of network devices located within the indoor space;
    transmitting a request signal for position information of at least one user who is located within the indoor space, to a gateway located within the indoor space;
    receiving the position information of the at least one user from the gateway;
    displaying the received position information of the at least one user on the space drawing;
    recognizing that an icon selected among the displayed at least one icon is overlapped on an image corresponding to a first network device, that is closest to a recipient of the at least one message to be transmitted, among the plurality of network devices comprised in the space drawing; and
    transmitting the at least one message corresponding to the selected icon to the first network device such that the at least one message is outputted through the first network device that is closest to the recipient.

2. The method of claim 1, wherein the displaying of the at least one icon comprises:
    displaying a message input window;
    receiving a message through the message input window;
    iconizing the received message; and
    displaying at least one icon corresponding to the received message in a list.

3. The method of claim 1, wherein the recognizing an overlapping of the selected icon among the displayed at least one icon and the image of the first network device comprised in the space drawing comprises:
    detecting a selection of at least one icon among the displayed at least one icon; and
    detecting a release of the selected icon on the image of the first network device displayed on the space drawing.

4. The method of claim 1, wherein the displaying of the space drawing visualizing the indoor space comprises:
    transmitting a request signal for power consumption information of the plurality of network devices, to the gateway located within the indoor space;
    receiving the power consumption information of the plurality of network devices from the gateway; and
    displaying the received power consumption information on the space drawing.

5. A method of operating a gateway, the method comprising:
    receiving space information displaying an image of a plurality of network devices on a space drawing visualizing an indoor space, from an electronic device;
    storing the space information;
    receiving a request signal for position information of at least one user who is located within the indoor space from the electronic device;
    searching the position information of the at least one user;
    transmitting the position information of the at least one user to the electronic device; and
    in response to receiving a message for displaying on a first network device, that is closest to a recipient of the at least one message to be transmitted, among the plurality of network devices from the electronic device, transmitting the message to the first network device by using the stored space information such that the message is outputted through the first network device that is closest to the recipient.

6. The method of claim 5,
    wherein the searching of the position information of the at least one user comprises searching the position information of the at least one user using a sensing signal of a sensing device located within the indoor space, and
    wherein the sensing signal comprising at least one of a signal related to a user motion, an image signal, a beacon signal, a Bluetooth signal, and an ultrasonic signal.

7. The method of claim 5, further comprising:
    in response to receiving a request signal for power consumption information of the plurality of network devices from the electronic device, collecting the power consumption information from the plurality of network devices; and
    in response to receiving a power saving mode enable instruction for a second network device from the electronic device, transmitting the power saving mode enable instruction to the second network device.

8. An electronic device comprising:
    a display;
    a communication interface; and
    a processor controlling the display and the communication interface,
    wherein the processor is configured to:
        display a space drawing visualizing an indoor space and at least one icon related to at least one message to be transmitted to at least one of a plurality of network devices located within the indoor space,
        transmit a request signal for position information of at least one user who is located within the indoor space, to a gateway located within the indoor space through the communication interface,
        receive the position information of the at least one user from the gateway,
        display the received position information of the at least one user on the space drawing through the display,
        recognize that an icon selected among the displayed at least one icon is overlapped on an image corresponding to a first network device, that is closest to a recipient of the at least one message to be transmitted, among the plurality of network devices comprised in the space drawing, and transmit the at least one message corresponding to the selected icon, to the first network device through the communication interface such that the at least one message is outputted through the first network device that is closest to the recipient.

9. The device of claim 8, wherein the processor is further configured to:
display a message input window,
receive a message through the message input window,
iconize the received message, and
display this in a list of the displayed icon.

10. The device of claim 8, wherein the processor is further configured to:
detect that one icon is selected among the displayed at least one icon, and
detect that the selection of the icon is released on the image of the first network device displayed on the space drawing, thereby recognizing that the selected icon is overlapped on the image of the first network device.

11. The device of claim 8, wherein the processor is further configured to:
transmit a request signal for power consumption information of the plurality of network devices, to the gateway located within the indoor space through the communication interface,
receive the power consumption information of the plurality of network devices from the gateway, and
display the received power consumption information on the space drawing through the display.

12. A gateway comprising:
a communication interface;
a memory; and
a processor controlling the communication interface and the memory,
wherein the processor is configured to:
receive space information displaying an image of a plurality of network devices on a space drawing visualizing an indoor space, from an electronic device through the communication interface,
store the space information,
receive a request signal for position information of at least one user who is located within the indoor space from the electronic device through the communication interface,
search the position information of the at least one user,
transmit the position information of the at least one user to the electronic device, and
in response to receiving a message for displaying on a first network device, that is closest to a recipient of the at least one message to be transmitted, among the plurality of network devices from the electronic device, transmit the message to the first network device by using the stored space information such that the message is outputted through the first network device that is closest to the recipient.

13. The device of claim 12,
wherein the processor is further configured to search the position information of the at least one user using a sensing signal of a sensing device located within the indoor space, and
wherein the sensing signal comprising at least one of a signal related to a user motion, an image signal, a beacon signal, a Bluetooth signal, and an ultrasonic signal.

14. The device of claim 12, wherein the processor is further configured to:
in response to receiving a request signal for power consumption information of the plurality of network devices from the electronic device through the communication interface, collect the power consumption information from the plurality of network devices, and
in response to receiving a power saving mode enable instruction for a second network device from the electronic device, transmit the power saving mode enable instruction to the second network device.

* * * * *